US007786681B2

(12) United States Patent
Inoue et al.

(10) Patent No.: US 7,786,681 B2
(45) Date of Patent: Aug. 31, 2010

(54) INVERTER CIRCUIT, FLUORESCENT TUBE LIGHTING APPARATUS, BACKLIGHT APPARATUS, AND LIQUID CRYSTAL DISPLAY

(75) Inventors: Yutaka Inoue, Mie (JP); Masaki Shimizu, Tochigi (JP); Shuhki Ohtani, Tochigi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 11/855,536

(22) Filed: Sep. 14, 2007

(65) Prior Publication Data
US 2008/0012500 A1    Jan. 17, 2008

Related U.S. Application Data

(62) Division of application No. 10/523,107, filed as application No. PCT/JP03/08563 on Jul. 4, 2003.

(30) Foreign Application Priority Data
Aug. 6, 2002    (JP)    ............................... 2002-228595

(51) Int. Cl.
*H05B 41/24*    (2006.01)
*H05B 39/00*    (2006.01)

(52) U.S. Cl. ..................... 315/277; 315/276; 315/312

(58) Field of Classification Search ... 315/169.1–169.3, 315/169.4, 312, 277, 185 R, 294; 345/76, 345/84, 104, 105
See application file for complete search history.

(56) References Cited

U.S. PATENT DOCUMENTS

| 4,503,362 A | 3/1985 | Hanlet |
| 5,055,747 A * | 10/1991 | Johns ......................... 315/307 |
| 5,390,276 A * | 2/1995 | Tai et al. ..................... 385/146 |
| 5,466,992 A * | 11/1995 | Nemirow et al. ............ 315/276 |
| 5,886,880 A * | 3/1999 | Hisanaga ..................... 363/20 |
| 5,896,120 A | 4/1999 | Iguchi et al. |
| 6,044,003 A * | 3/2000 | Toshinari et al. .............. 363/97 |
| 6,087,757 A | 7/2000 | Honbo et al. |
| 6,181,066 B1 * | 1/2001 | Adamson ..................... 315/282 |
| 6,210,018 B1 * | 4/2001 | Kassay et al. ................ 362/216 |
| 6,310,444 B1 * | 10/2001 | Chang ......................... 315/282 |

(Continued)

FOREIGN PATENT DOCUMENTS

JP    59-144376 A    8/1984

(Continued)

*Primary Examiner*—Douglas W Owens
*Assistant Examiner*—Minh D A
(74) *Attorney, Agent, or Firm*—Birch, Stewart, Kolasch & Birch, LLP

(57) ABSTRACT

A driving apparatus and a driving method are disclosed that are capable of uniformly lighting each entire fluorescent tube irrespective of the length or number of fluorescent tubes when simultaneously driving a plurality of fluorescent tubes in a fluorescent tube lighting apparatus. When two inverter circuits having respective transformers are provided at both ends of a fluorescent tube to light the fluorescent tube by push-pull driving, feedback windings of transformers not used in self-excited oscillation of each inverter circuit are connected together, with the transformer connection that connects together the feedback windings being either in-phase or in opposite phase, and the method of connection for fluorescent tubes connecting to secondary windings of each transformer can be changed in accordance with that connection method.

22 Claims, 17 Drawing Sheets

U.S. PATENT DOCUMENTS

| | | | |
|---|---|---|---|
| 6,326,738 B1 * | 12/2001 | McAndrew | 315/227 R |
| 6,407,480 B1 | 6/2002 | Nakanishi et al. | |
| 6,424,247 B2 * | 7/2002 | Suzuki | 336/110 |
| 6,433,458 B2 | 8/2002 | Nakatsuka et al. | |
| 6,515,427 B2 | 2/2003 | Oura | |
| 6,534,934 B1 | 3/2003 | Lin et al. | |
| 6,566,821 B2 | 5/2003 | Nakatsuka et al. | |
| 6,570,344 B2 | 5/2003 | Lin | |
| 6,593,707 B1 | 7/2003 | Shih | |
| 6,617,807 B2 | 9/2003 | Ito et al. | |
| 6,636,190 B2 | 10/2003 | Hirakata et al. | |
| 6,661,181 B2 * | 12/2003 | Shin | 315/169.4 |
| 6,686,704 B2 | 2/2004 | Suzuki | |
| 6,888,529 B2 * | 5/2005 | Bruning et al. | 345/102 |
| 2002/0047619 A1 * | 4/2002 | Oura et al. | 315/276 |
| 2002/0130628 A1 | 9/2002 | Shin | |

FOREIGN PATENT DOCUMENTS

| | | |
|---|---|---|
| JP | 61-176097 A | 8/1986 |
| JP | 62-234126 A | 10/1987 |
| JP | 63-313136 A | 12/1988 |
| JP | 1-134398 U | 9/1989 |
| JP | 4-36997 A | 2/1992 |
| JP | 5-090897 | 4/1993 |
| JP | 5-119311 A | 5/1993 |
| JP | 5-130750 A | 5/1993 |
| JP | 5-90897 U | 12/1993 |
| JP | 6-19299 U | 3/1994 |
| JP | 8-110522 A | 4/1996 |
| JP | 8-122776 A | 5/1996 |
| JP | 8222393 | 8/1996 |
| JP | 10-82914 A | 3/1998 |
| JP | 10-92589 A | 4/1998 |
| JP | 11-8087 A | 1/1999 |
| JP | 2000-352718 | 12/2000 |
| JP | 2001-110582 A | 4/2001 |
| JP | 2001-126888 A | 5/2001 |
| JP | 2001-210126 A | 8/2001 |
| JP | 2001-268941 A | 9/2001 |
| JP | 2002-123226 A | 4/2002 |
| KR | 2002-61834 A | 7/2002 |
| TW | 478292 | 3/2002 |

* cited by examiner

FIG.1b  DIRECT COUPLING
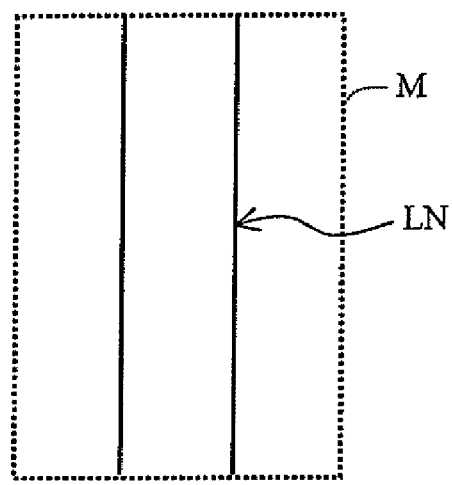
FIG.1c  COUPLING VIA TRANSFORMER
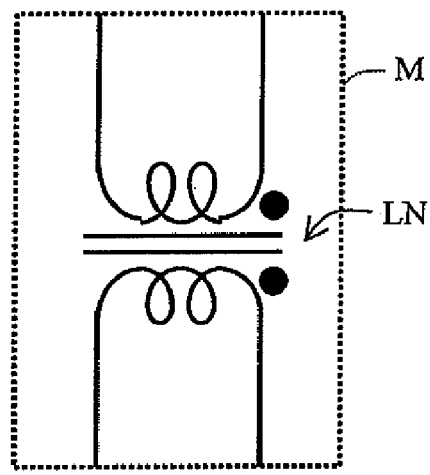
FIG.1d  COIL PROXIMITY
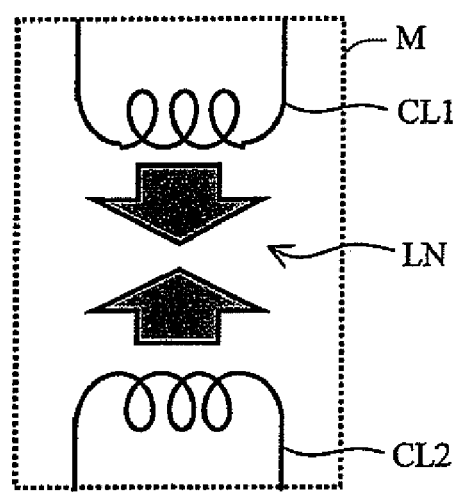

FIG.2b  COUPLING VIA TRANSFORMER
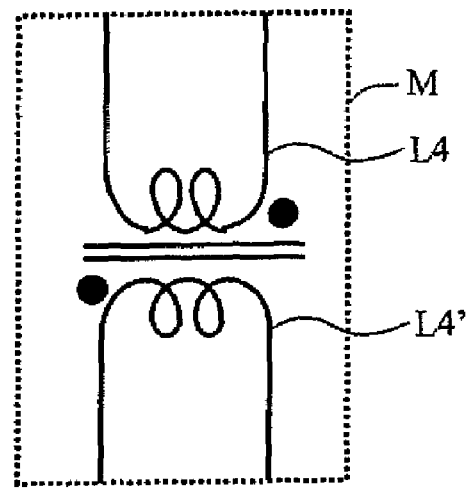
FIG.2c
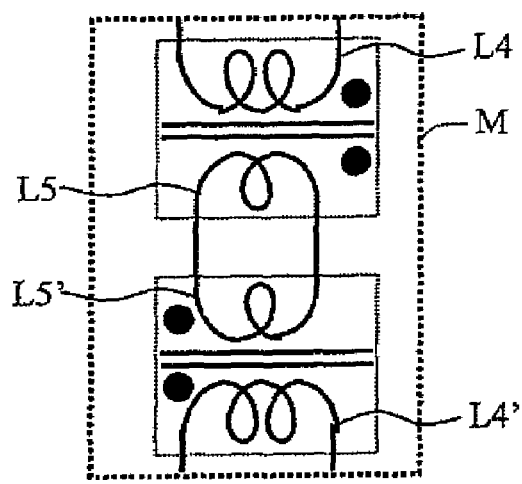
FIG.2d  COIL PROXIMITY
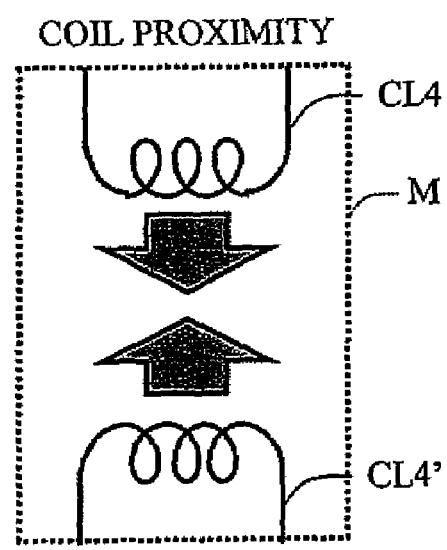

COIL PROXIMITY TYPE

US 7,786,681 B2

INVERTER CIRCUIT, FLUORESCENT TUBE LIGHTING APPARATUS, BACKLIGHT APPARATUS, AND LIQUID CRYSTAL DISPLAY

CROSS-REFERENCED TO RELATED APPLICATIONS

This application is a Divisional of co-pending application Ser. No. 10/523,107 filed on Feb. 3, 2005 and for which priority is claimed under 35 U.S.C. §120. application Ser. No. 10/523,107 is the national phase of PCT International Application No. PCT/JP03/08563 filed on Jul. 4, 2003 under 35 U.S.C. §371. The entire contents of each of the above-identified applications are hereby incorporated by reference.

TECHNICAL FIELD

The present invention relates to an inverter circuit driving a driven unit, a fluorescent tube lighting apparatus driving a fluorescent tube, a backlight apparatus supplying uniform planar light using a fluorescent tube driving apparatus, and a liquid crystal display that can display an image by assigning gradation levels to light emitted from the backlight apparatus using a liquid crystal panel.

BACKGROUND ART

Japan Utility Model Publication (Unexamined Application) No. 5-90897 discloses the following art as a conventional example of an inverter circuit driving a driven unit using two step-up transformers.

That is, as shown in FIG. 13, the conventional example describes an inverter circuit 308 comprising: an inverter circuit 304a having a step-up transformer 301a having a primary winding 309a, a secondary winding 305a and a feedback winding 306, and a pair of transistors 302a and 303a for push-pull driving; and another inverter circuit 304b having a step-up transformer 301b having a primary winding 309b and a secondary winding 305b, and a pair of transistors 302b and 303b for push-pull driving, wherein the feedback winding 306 of step-up transformer 301a is also used in self-excited oscillation of the other inverter circuit 304b. By means of the inverter circuit 308, alternating voltages that are in opposite phase to each other are applied between secondary winding 305a and secondary winding 305b that are connected to both ends of a fluorescent tube 307.

Inverter circuit 308 of the above conventional example uses only the feedback winding of step-up transformer 301a comprised by one inverter circuit 304a to attempt to reverse the phase relationship for the phases of the output from the secondary windings of the step-up transformers on both sides, and the feedback winding of the other step-up transformer is not used. In this configuration, the phases of voltages output from the secondary windings 305a and 305b of the two inverter circuits 304a and 304b cannot be stabilized to reverse the phase relationship thereof, and thus driving becomes imbalanced and both ends of fluorescent tube 307 cannot be lit to an equal level of brightness.

More specifically, when configuring the controlling inverter circuits according to the above conventional art so that the output voltages of inverter circuits connected to both ends of a driven unit are of opposite phases, because the oscillation frequencies of inverter 304a and inverter 304b are different to each other, a phase difference is generated and oscillation becomes unstable. Accordingly, a problem arises whereby potential at both ends of the driven unit cannot be stabilized to reverse the phase relationship thereof.

With the foregoing problem in view, it is an object of the present invention to provide an inverter circuit that stabilizes the potentials at both ends of a driven unit to reverse the phase relationship thereof, and improves the power efficiency of the driven unit.

A unit driven using this type of inverter circuit may be a fluorescent tube, as also described in the conventional example. For a fluorescent tube it is desirable that the brightness thereof be uniform from one end of the tube to the other end. However, when a fluorescent tube is lit using the above conventional art, the phases at both ends do not stabilize and the phase relationship cannot be reversed, and as mentioned above, a problem thus arises that brightness at both ends does not become constant.

Therefore, with the foregoing problem in view, another object of the present invention is to provide a fluorescent tube driving apparatus that stabilizes the potentials applied at both ends of a fluorescent tube to reverse the phase relationship thereof, to thereby redress an imbalance in the luminescent brightness of the fluorescent tube and emit light almost uniformly across the entire tube, and furthermore, improve the luminous efficiency of the fluorescent tube.

A backlight is used as a lighting apparatus for a display apparatus such as, for example, a translucent liquid crystal display, and a fluorescent tube is mainly used as the lighting source of the backlight. In such type of backlight, a uniform level of brightness is required throughout the entire display to prevent inconsistencies in brightness being generated on the display screen. However, when driving a backlight using the conventional art, since it is not possible to stabilize the voltages at both ends of a fluorescent tube to reverse the phase relationship thereof, the brightness at both end sides does not become constant and it is difficult to obtain uniform brightness across the entire display.

Therefore, with the foregoing problem in view, it is a further object of the present invention to provide a backlight apparatus that can stabilize the potentials applied at both ends of a fluorescent tube to reverse the phase relationship thereof, to thereby redress imbalances in luminescent brightness at both ends of the fluorescent tube, and which is capable of having an irradiance distribution of uniform brightness throughout an entire display, and furthermore, high luminous efficiency.

Further, for a liquid crystal display, it is required that the entire display screen be stabilized to designate gradation levels to provide fine image quality. However, a problem exists whereby it is difficult to provide fine image quality unless the brightness of a backlight employed as the light source of the liquid crystal display is constant over the entire display.

Therefore, with the foregoing problem in view, it is a further object of the present invention to provide a liquid crystal display wherein potentials applied at both ends of a fluorescent tube used in a backlight of the liquid crystal display are stabilized to reverse the phase relationship thereof, to thereby redress imbalances in luminescent brightness at both ends of the fluorescent tube to obtain uniform planar luminescence over the entire display, and based thereon, provide fine image quality and furthermore, high luminous efficiency.

DISCLOSURE OF THE INVENTION

In order to achieve the above objects, the fluorescent tube lighting apparatus of the present invention is characterized by comprising inverter circuits provided in a pair at both ends of a driven unit and having a means whereby the inverter circuits are indirectly connected with each other so that alternating voltages applied at both ends of the driven unit maintain a reverse phase relationship with respect to each other. Herein, the term "indirectly connected" means a connection not involving movement of a carrier (electron or positive hole) between each of the inverter circuits. More specifically, the method is exemplified by a connection between the inverter circuits that utilizes an inductive coupling effect typified by a coil or transformer or the like.

Further, the fluorescent tube lighting apparatus of the present invention is characterized by utilizing as a means for the above "indirect connection", (1) coupling between higher-order windings not used in self-excited oscillation of each inverter circuit, or (2) so-called "inductive coupling between windings" involving coupling between at least one winding in each inverter circuit, typified by coupling between choke coils of each inverter circuit or the like.

In addition, the fluorescent tube lighting apparatus of the present invention is characterized by using as a means for the above "inductive coupling between windings", in the case of (1) above: direct coupling, coupling via transformer, proximity coupling of parallel coils, or the like; and in the case of (2) above: coupling via transformer, proximity coupling of parallel coils, transformed coupling, or simple proximity coupling.

Further, the fluorescent tube lighting apparatus of the present invention is characterized in that the driving of each inverter circuit is in an opposite phase relationship (opposite phases between inverters) with respect to the other inverter circuit.

According to any of the configurations of the above fluorescent tube lighting apparatus, since voltages applied to both ends of a driven unit are stabilized to reverse the phase relationship thereof, it is possible to apply stabilized alternating voltages of opposite phases with the same frequency at both ends of a driven unit.

In addition, the fluorescent tube lighting apparatus of the present invention is characterized in that, when each inverter circuit has two output terminals, the two outputs are in a reverse phase relationship with respect to each other (opposite phases within an inverter).

Further, the fluorescent tube lighting apparatus of the present invention is characterized in that, as the above method of reversing the phase relationship between inverters, either, (1) primary windings of two 1-input, 1-output inverter transformers are wound in reverse with respect to each other, (2) secondary windings of one 1-input, 2-output inverter transformer are wound in reverse with respect to each other, or (3) in two 1-input, 2-output inverter transformers, secondary windings within the inverter transformers are wound in reverse with respect to each other, and secondary windings of each inverter transformer are wound in reverse with respect to secondary windings of the other inverter transformer.

According to any of the configurations of the above fluorescent tube lighting apparatus, it is possible to cancel out electrical or magnetic noise generated in a core or the like by a transformer induction effect inside each inverter circuit, making it possible to eliminate noise generated at the two ends of a driven unit.

Herein, for a driven unit, for example, a heater such as a sheath heater or a Nichrome heater, or a fluorescent tube or the like can be used. When any of the above inverter circuits is used with a sheath heater or a Nichrome heater, the heating state at both ends of the sheath heater can be equalized, and thus the inverter circuits are superior for use in conditions that require a uniform heating state. Further, when the above inverter circuits are used with a fluorescent tube, uniform brightness can be obtained at both ends of the fluorescent tube, and thus the inverter circuits are superior for use in conditions that require a uniform level of brightness.

Regarding a means for connecting together feedback windings of inverter circuits at both ends of a driven unit, when the driven unit is linearly disposed and the inverter circuits at both ends are disposed at the end parts of the driven unit, it is necessary to provide a connecting means of a length equivalent to the length of the driven unit, and as the length of the means for connecting together the feedback windings increases, the problem may arise that power loss and noise are generated.

A specific example of a case where noise is a problem is as follows. When driving a fluorescent tube used in a backlight of a large-size liquid crystal display using any of the above inverter circuits, noise is generated from a connecting wire that connects together feedback windings, and this generates a problem whereby the image of the display screen of the liquid crystal panel is adversely affected.

To solve this problem it is desirable to make the voltage applied to the connecting wire that connects together the feedback windings of the inverter circuits at both ends of the driven unit a low voltage. By lowering the voltage the noise can be reduced, and at the same time, power loss can also be decreased.

Therefore, the fluorescent tube lighting apparatus of the present invention is characterized in that the two ends of a fluorescent tube are coupled by means of a secondary winding of an inverter transformer having a tertiary winding used in self-excited oscillation, and a secondary winding of an inverter transformer having a tertiary winding not used in self-excited oscillation, respectively.

Further, the fluorescent tube lighting apparatus of the present invention is characterized in that the number of turns of a tertiary winding used in the above indirect connection is less than the number of turns of a tertiary winding used in self-excited oscillation.

According to any of the configurations of the above fluorescent tube lighting apparatus, it is possible to equalize the balance of electric power applied to a plurality of fluorescent tubes in a multiple-light type fluorescent tube lighting apparatus, and also to control the degree of coupling between inverter circuits to suppress the strength of noise exerted on the entire fluorescent tube lighting apparatus.

Furthermore, the fluorescent tube lighting apparatus of the present invention is characterized in that, for fluorescent tubes disposed in parallel using a plurality of the above fluorescent tube lighting apparatuses, the fluorescent tube lighting apparatuses are indirectly connected so that the phases of alternating voltages applied to the fluorescent tubes are inverted per each fluorescent tube or per the number of fluorescent tubes driven by a single fluorescent tube lighting apparatus.

In addition, the fluorescent tube lighting apparatus of the present invention is characterized by utilizing as a means for the above "indirect connection", (1) coupling between tertiary windings not used in self-excited oscillation of each fluorescent tube lighting apparatus, or (2) so-called "inductive coupling between windings", involving coupling between at least one winding in each fluorescent tube lighting apparatus, and typified by coupling between choke coils of each fluorescent tube lighting apparatus or the like.

Further, the fluorescent tube lighting apparatus of the present invention is characterized by using as a for the means above "inductive coupling between windings", in the case of (1): direct coupling, coupling via transformer, proximity coupling of parallel coils, or the like; and in the case of (2):

coupling via transformer, proximity coupling of parallel coils, transformed coupling, or simple proximity coupling.

According to any of the configurations of the above fluorescent tube lighting apparatus it is possible to synchronize the driving of the fluorescent tube lighting apparatus, thus enabling the elimination of noise and flicker and the like of the fluorescent tube lighting apparatus.

This type of fluorescent tube lighting apparatus is very suitable for use in a location requiring uniform brightness over an entire area, such as, for example, in a backlight apparatus lighting a liquid crystal panel of a translucent liquid crystal display.

Therefore, according to the present invention there is provided a backlight apparatus characterized by comprising any of the above fluorescent tube lighting apparatuses, a reflector plate disposed facing a fluorescent tube comprised by the fluorescent tube lighting apparatus that reflects light emitted by the fluorescent tube to the fluorescent tube side, and a light diffuser disposed facing the side of the fluorescent tube opposite the side on which the reflector plate is disposed. Alternatively, there is provided a backlight apparatus characterized by comprising any of the above fluorescent tube lighting apparatuses and a light-guiding plate that converts light emitted by a fluorescent tube comprised by the fluorescent tube lighting apparatus into planar light. By employing such a configuration the brightness at both ends of a fluorescent tube becomes constant, thus enabling the provision of a backlight apparatus emitting planar light of a more uniform brightness.

When using this kind of backlight apparatus in a liquid crystal display, a liquid crystal display having favorable image quality can be provided based on the uniform brightness of the backlight apparatus. Therefore, according to the present invention there is provided a liquid crystal display characterized by comprising a liquid crystal panel disposed on a side opposite the side of a light diffuser of a backlight apparatus on which a fluorescent tube is disposed, wherein the liquid crystal panel changes the transmittance of light emitted from the backlight apparatus to display a specified image.

Further, according to the present invention there is provided a liquid crystal display characterized by comprising a liquid crystal panel disposed facing a surface of a light-guiding plate of a backlight apparatus that emits planar light, wherein the liquid crystal panel changes the transmittance of light to display a specified image.

By employing such configurations, since uniform planar luminescence is provided from the backlight apparatus, the brightness over the entire display screen can be equalized, and based thereon a liquid crystal display having high image quality can be provided.

BRIEF DESCRIPTION OF THE DRAWINGS

FIGS. 1a to 1e are circuit diagrams of the fluorescent tube lighting apparatus of the first embodiment of the present invention.

FIGS. 2a to 2d are circuit diagrams of the fluorescent tube lighting apparatus of the second embodiment of the present invention.

BEST MODE FOR CARRYING OUT THE INVENTION

Figure 1A:
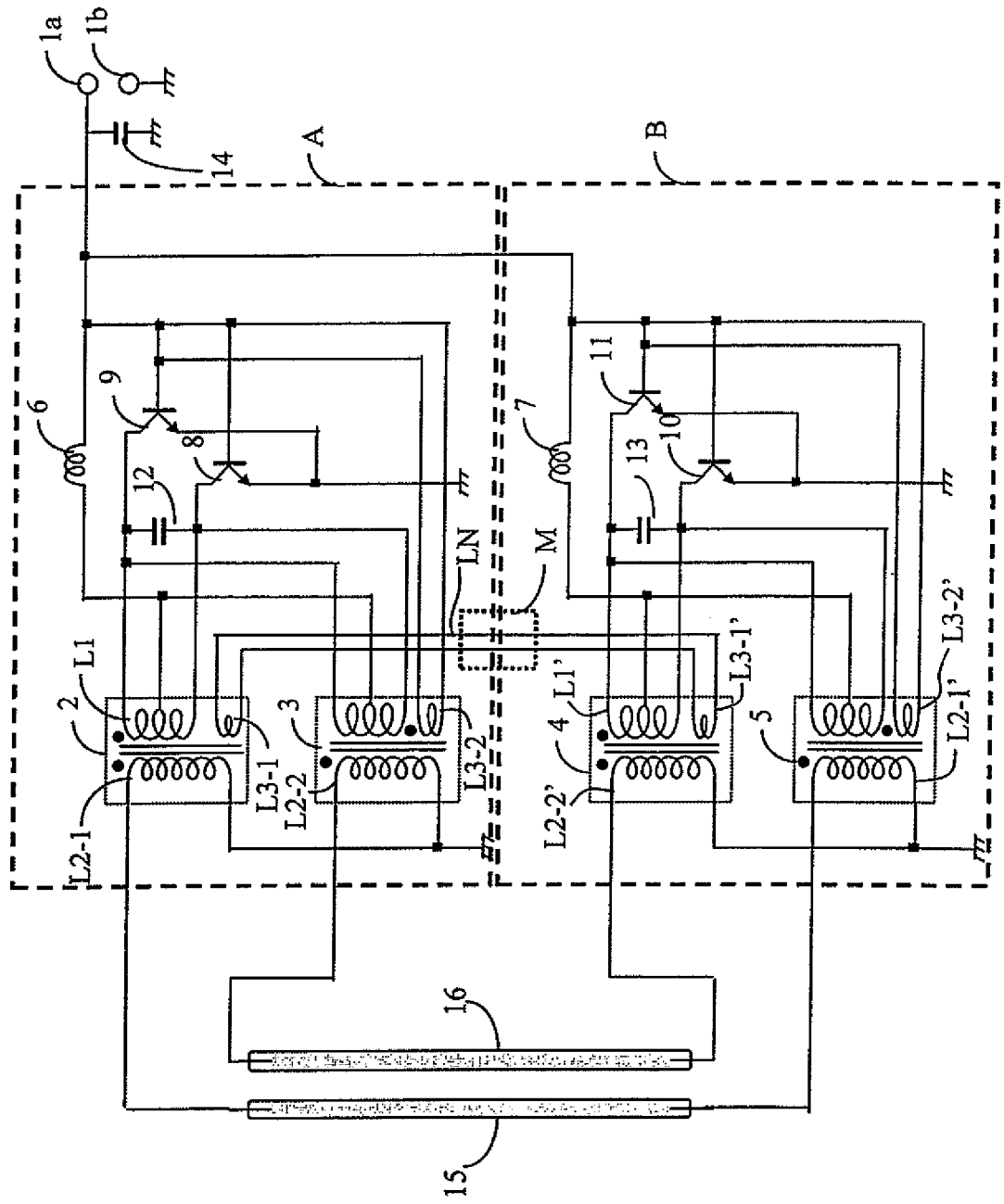

This patent application includes all of the contents as disclosed in Japanese Patent Application No. 2002-228595, which is the basic application that is a priority document of the present application, and matters disclosed in the above patent application shall constitute a part of the contents of the present patent application.

The term "inverter transformer" in this specification is used with the meaning corresponding to the term "voltage transformer" in the above basic application. More specifically, in the basic application the term "voltage transformer" is used with the meaning of a so-called inverter that converts direct current into alternating current, and also includes the meaning of step-up and step-down conversion in the respect of converting from alternating current of a primary side to alternating current of a secondary side. In the present specification, the term "inverter transformer" also includes the meaning of a voltage transformer wherein the turns ratio of the primary side and secondary side are made different.

Further, the term "higher-order winding" means a winding for transforming voltage (includes step-up and step-down) other than a primary winding, and includes a secondary winding, tertiary winding, feedback winding and the like. In addition, a higher-order winding used in self-excited oscillation on the primary side means a feedback winding or a higher-order winding other than a primary or secondary winding used for self-excited oscillation, and for example, includes any tertiary winding. Also, for example, the term "tertiary winding not used in self-excited oscillation" means a tertiary winding for non self-excited oscillation use.

Embodiments relating to the inverter circuit of the present invention will now be described referring to the drawings. Hereunder, a fluorescent tube is taken as an example of a driven unit that is driven by an inverter circuit, and embodiments in a case of using the inverter circuit of the present invention in a fluorescent tube driving apparatus that drives the fluorescent tube are described based on FIGS. 1 to 5.

First, a fluorescent tube lighting apparatus according to the first embodiment of the present invention will be described referring to FIGS. 1(a) to 1(e). FIG. 1(a) illustrates an example of the circuitry of the principal part of the fluorescent tube lighting apparatus according to the present embodiment. As shown in FIG. 1(a), inverter circuits A and B are configured with two inverter transformers 2 and 5, or 3 and 4 as one set, and are respectively provided at the two ends of two fluorescent tubes 15 and 16 as driven units. The circuitry comprises a configuration (LN) whereby, of the inverter transformers 2 and 5, or 3 and 4 that are respectively connected to the two ends of fluorescent tube 15 or 16, the two ends of feedback windings of the step-up transformers not used in self-excited oscillation are connected to each other.

The principal components of the apparatus shown in FIG. 1(*a*) are two inverter circuits A and B, and two fluorescent tubes 15 and 16. Further, inverter circuits A and B comprise a direct current power supply input terminal 1 (1*a*, 1*b*), inverter transformers 2 to 5, choke coils 6 and 7, transistors 8 to 11, resonance capacitors 12 and 13, a capacitor as a filter 14, and so forth. Of these components, inverter transformers 2 to 5 are composed of primary windings L1 and L1' constituting one part of an oscillation circuit, secondary windings L2 (L2-1 to L2-2') supplying high voltage to the fluorescent tubes, and tertiary windings L3-2 and L3-2' that are capable of switching transistors 8 to 11.

Next, the respective operating principles of inverter circuits A and B shown in FIG. 1(*a*) will be described taking inverter circuit A as an example. In general, the purpose of an inverter circuit for a fluorescent tube is to supply alternating current (a frequency of, for example, several 10s of Hz to several 10s of kHz) of high voltage (for example, several 100s to several 1000s of volts) to the fluorescent tube. Therefore, in order to first convert direct voltage input from input terminal 1*a* into alternating voltage, an oscillation circuit (constituted by transformers 2 and 3, choke coil 6, and resonance capacitor 12) is provided to convert the direct current into alternating current. The frequency thereof is chiefly determined by the main inductance of transformers 2 and 3 and each constant of choke coil 6 and resonance capacitor 12 and the like.

Conversion of input voltage to a high voltage can be performed by means of inverter transformers 2 and 3. More specifically, by making the turns ratio of the secondary winding L2 relative to the primary winding L1 of each inverter transformer several tenfold to several hundredfold it is possible to convert a voltage of several dozen volts into several hundred to several thousand volts in the secondary winding.

Further, in order to control the direction of current flowing through the primary winding side by means of transistors 8 and 9, inverter transformers 2 and 3 are provided with a tertiary winding L3. That is, the voltage is suitably transformed down by means of the turns ratio of tertiary winding L3 with respect to secondary winding L2, so that appropriate voltages can be applied alternately on the side of the bases of transistors 8 and 9. Thus, by means of alternating voltage waveforms of about several volts generated in the tertiary windings, transistors 8 and 9 alternately repeat an ON/OFF state to enable stable driving of inverter circuit A. Also, in a case of using a plurality of inverter transformers in a single inverter circuit, the use of one tertiary winding is normally sufficient.

The above describes the general driving principle of the inverter circuit. A driving system of an inverter circuit in which a means imparting a switching action to transistors 8 and 9 is supplied by means of tertiary windings L3-2 and L3-2' of the inverter transformer in this manner is commonly referred to as "self-excitation". (Hereunder, to distinguish between a tertiary winding actually performing this type of function and a tertiary winding not performing this function the terms "tertiary winding used in self-excited oscillation" and "tertiary winding not used in self-excited oscillation" are employed.)

The configuration of the fluorescent tube lighting apparatus according to the present invention is as follows. In the inverter circuit having two fluorescent tubes shown in FIG. 1(*a*), for example, regarding fluorescent tube 15, the primary winding of transformer 2 and the primary winding of transformer 4 are in opposite phase, while the secondary winding of transformer 2 and the secondary winding of transformer 5 are in phase. Regarding fluorescent tube 16 that is disposed together with fluorescent tube 15, the primary winding of transformer 3 and the primary winding of transformer 5 are in opposite phase, while the secondary winding of transformer 3 and the secondary winding of transformer 4 are in phase. In addition, the tertiary windings not used in self-excited oscillation are indirectly connected so that transformers 3 and 4, or 2 and 5 come to be in opposite phase relative to each other.

More specifically, in the above relationship, of the primary windings and secondary windings of the two transformers 3 and 4 connected to the two ends of one fluorescent tube, either of the windings are in phase and the other of the windings are in opposite phase relative to each other, and when the inverter circuits are indirectly connected to each other using tertiary windings not used in self-excited oscillation, the tertiary windings are indirectly connected so as to synchronize inverters A and B in phase, so that alternating voltages applied to the two ends of the fluorescent tube are in opposite phase with respect to each other.

As shown in FIG. 1(*a*), the fluorescent tube lighting apparatus according to the first embodiment of the present invention is characterized by having, in the two inverter circuits A and B connected to the respective two ends of fluorescent tubes 15 and 16, a configuration (LN) that connects together the tertiary windings not used in self-excited oscillation that are provided in each of inverter circuits A and B. Thus, electrical coupling is not formed between inverter circuits A and B, and the circuits can be made to function so as to attune each other's phases by means of an induction effect between secondary windings L2 and tertiary windings L3-1 and L3-1' of inverter transformers 2 and 4. Accordingly, it is possible to "indirectly connect" inverter circuits A and B by means of an induction effect.

Regarding the connection to fluorescent tubes 15 and 16, from each of inverter circuits A and B one terminal of the secondary windings L2 of the inverter transformers may be tapped and connected, so that voltages applied respectively to the two ends of fluorescent tubes 15 and 16 are in an opposite phase relationship with each other.

According to the above circuitry, since the alternating current waveforms have no waveform distortion and sufficient high voltage can be applied to fluorescent tubes 15 and 16, the fluorescent tubes can be driven stably. Further, the luminous efficiency with respect to the power of the fluorescent tubes can also be improved by approximately 10 percent compared to a case of driving one fluorescent tube using one inverter transformer.

Regarding the method for indirectly connecting the inverter circuits, as illustrated in the dotted line part M of FIG. 1(*b*), a configuration that directly connects together windings not used for self-excited oscillation is a simple and easy method since it can be implemented without increasing the number of component parts, however the "indirect connection method" according to the present embodiment is not limited to the method shown in FIG. 1(*b*). Other methods, that can be used in dotted line part M include, as shown in FIG. 1(*c*), a configuration involving coupling through a transformer to utilize the induction effect thereof (coupling via transformer), or as shown in FIG. 1(*d*), a configuration in which coils CL1 and CL2 that are connected in parallel to tertiary windings not used in self-excited oscillation are disposed in proximity to each other (coil proximity). These configurations are also included in the scope of the present invention.

Further, the method of indirectly connecting the inverter circuits may be one using a connection that is either in-phase or in opposite phase, as long as the configuration is such that voltages of opposite phases relative to each other are applied at the two ends of the fluorescent tubes. However, taking into consideration commonality of electronic components and circuit design such as the wiring patterns of inverter boards, or the influences of measures to counter electrical or magnetic noise of transformers, a connection that is in opposite phase is preferable since the above effect can be obtained thereby and such influences can also be decreased.

If high voltage alternating voltages applied respectively to fluorescent tubes 15 and 16 are in opposite phase to each other, radiant noise originating from each of the fluorescent tubes can cancel each other out, thus enabling noise reduction. The above-described principles apply even when the number of driven fluorescent tubes is greater than two, and such cases are also within the scope of the present invention.

Regarding the method of connecting the inverter transformers to fluorescent tubes 15 and 16, for example, in a case where fluorescent tube 15 is connected via inverter transformers 2 and 4 and fluorescent tube 16 is connected via inverter transformers 3 and 5, there are cases where even though the specifications and performance of the two fluorescent tubes 15 and 16 are the same, the brightness of each is different. This is because fluorescent tube 15 is connected by means of inverter transformers having tertiary windings L3-1 and L3-1' not used in self-excited oscillation, while fluorescent tube 16 is connected by means of inverter transformers having tertiary windings L3-2 and L3-2' used in self-excited oscillation. More specifically, since the power applied to the inverter transformer differs according to whether or not the tertiary winding thereof is used in self-excited oscillation, the power applied respectively to fluorescent tubes 15 and 16 may sometimes differ.

Therefore, according to the present embodiment, by employing the following combinations of fluorescent tubes 15 and 16 and inverter transformers 2, 5, 3, and 4 connected to both ends of the tubes, a method is enabled that equalizes the power applied to the two fluorescent tubes 15 and 16. That is, as shown in FIG. 1(a), one of the terminals of fluorescent tube 15 is connected to secondary winding L2-1 of inverter transformer 2 having a tertiary winding L3-1 not used in self-excited oscillation of inverter circuit A, while the other terminal of fluorescent tube 15 is connected to secondary winding L2-1' of inverter transformer 5 having a tertiary winding L3-2' used in self-excited oscillation of inverter circuit B. Likewise, a similar combination with the inverter transformers is provided for fluorescent tube 16 (refer to FIG. 1 (a)).

By selecting the combination of fluorescent tubes 15 and 16 and two inverter transformers as described above, the powers applied to the two fluorescent tubes 15 and 16 are adjusted in directions whereby they become equal. Accordingly, if the two fluorescent tubes are of the same specification and performance, the brightness will be roughly equal, and therefore, when using a fluorescent tube lighting apparatus according to the present embodiment to illuminate a backlight apparatus, for example, inconsistencies in brightness can be improved.

Further, the fluorescent tube lighting apparatus according to the present embodiment enables the indirect connection of inverter circuits, and furthermore, it can also make it possible for the noise of one of the inverter circuits to be easily propagated to the other inverter circuit. For example, when employing a means for dimming according to a duty dimming system, ripple noise emitted at activation of one of the inverter circuits is propagated to the other inverter circuit, and thus ripple noise of a higher voltage and higher current can be produced.

Therefore, in the fluorescent tube lighting apparatus according to the present embodiment, it is preferable that the number of turns of a tertiary winding not used in self-excited oscillation be made less than the number of turns of a tertiary winding used in self-excited oscillation. In a tertiary winding used in self-excited oscillation, normally, it is necessary to generate alternating electromotive force of about several volts at a maximum so that a base (or gate) of a transistor enters an ON state. However, in a tertiary winding not used in self-excited oscillation it is not necessary to generate such a large electromotive force, and if the number of turns is even about 0.5 turns the function thereof can be fulfilled. It is possible to fabricate this number of turns even with current transformer design technology, and it is thus sufficiently possible to fulfill the function of indirectly connecting inverter circuits. Furthermore, since this method allows the voltage applied to tertiary windings L3-1 and L3-2' to be a low voltage, it is also effective as a method of decreasing the power applied to tertiary windings L3-1 and L3-1' of the inverter transformers. Thus, it becomes possible to suppress voltage or current noise that can be generated within the fluorescent tube lighting apparatus to a minimum, and at the same time, power applied to an indirect connection between the inverter circuits can also be minimized.

In addition, regarding the inverter circuits, as described above there are cases where noise is also generated within the circuit itself, and in particular it is possible that magnetic fields originating from inverter transformers 2 to 5 may impart adverse effects arising from noise to other electronic components (such as a liquid crystal panel).

Therefore, the fluorescent tube lighting apparatus according to the present embodiment is characterized in that, in order to control noise originating in each of inverter circuits A and B, the outputs of secondary windings L2 of two inverter transformers 2 and 3 are made to be in opposite phase to each other. Specifically, for FIG. 1(a), a method is conceivable whereby the primary windings L1 of inverter transformers 2 and 3 that are connected in parallel are wound in reverse with respect to each other, the two terminals of primary winding L1 are switched with each other and connected, or the secondary windings are wound in reverse with respect to each other.

As described above, according to the fluorescent tube lighting apparatus of the present embodiment, because it is also possible to reduce noise imparted by one inverter circuit to the other inverter circuit, the noise of the overall fluorescent tube lighting apparatus is reduced, and thus adverse effects of noise and the like imparted to other electronic components are also lessened. There are no particular limiting conditions regarding the specifications of inverter transformers in the present embodiment, for example, the embodiment does not limit the design of a core, such as to a closed magnetic type or open magnetic type.

The inverter circuit illustrated in FIG. 1(a) is merely the basic configuration, and an inverter circuit to which a number of modifications or improvements have been added with respect to the present embodiment will fulfill a similar function. For example, a case where additional functions such as a dimming circuit or a circuit to detect errors accompanying a lamp failure or the like have been added, or a case of an inverter circuit provided with a modification whereby one only of the base terminals of transistors 8 and 9 is connected to input terminal 1 to reduce oscillation noise at the time of dimming are also within the scope of the present invention.

Figure 1E:
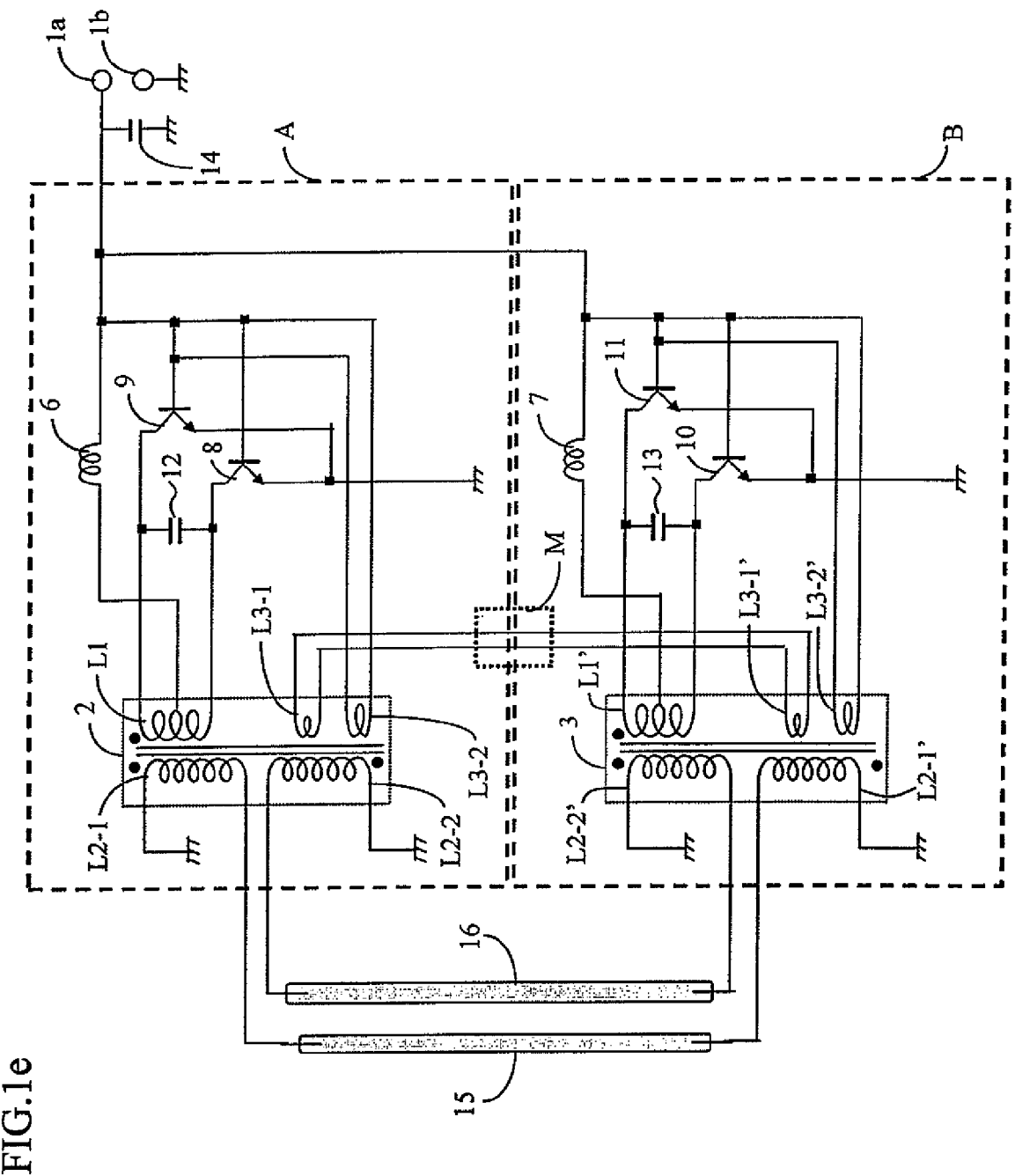

Next, a fluorescent tube lighting apparatus according to a modified example of the present embodiment will be described referring to FIG. 1(e). FIG. 1(e) shows a configuration example for a case using 1-input, 2-output inverter transformers (hereafter, referred to as a "2-in-1 transformer") in a fluorescent tube lighting apparatus. Inverter transformers 2 and 3 each have two tertiary windings, with one thereof being used as a tertiary winding used in self-excited oscillation L3-2 and L3-2' and the other being used as a tertiary winding not used in self-excited oscillation L3-1 and L3-1'.

As shown in FIG. 1(e), the principal components of the fluorescent tube lighting apparatus according to the modified example of the present embodiment are two inverter circuits A and B and fluorescent tubes 15 and 16. Inverter circuits A and B comprise a direct current power supply input terminal 1 (1a, 1b), inverter transformers 2 and 3, choke coils 6 and 7, transistors 8 to 11, resonance capacitors 12 and 13, and a capacitor as a filter 14. Of these components, inverter transformers 2 and 3 are configured to include primary windings L1 and L1', two secondary windings L2-1, L2-1', L2-2, and L2-2', and two tertiary windings L3-1 and L3-2 (L3-1' and L3-2'). The fluorescent tube lighting apparatus according to the present modified example uses L3-2 and L3-2' as tertiary windings used in self-excited oscillation and L3-1 and L3-1' as tertiary windings not used in self-excited oscillation.

A fluorescent tube lighting apparatus having this type of configuration has similar advantages to that of the configuration of the fluorescent tube lighting apparatus shown in FIG. 1(a).

According to the above circuitry, since the alternating current waveforms have no waveform distortion and sufficient high voltage can be applied to fluorescent tubes 15 and 16, the fluorescent tubes can be driven stably.

Further, according to the fluorescent tube lighting apparatus of the present embodiment, for example, by making the number of turns of the tertiary windings not used in self-excited oscillation L3-1 and L3-1' of inverter transformers 2 and 3 less than the number of turns of the tertiary winding used in self-excited oscillation L3-2 and L3-2', it is also possible to reduce the noise imparted by one inverter circuit to the other inverter circuit. In addition, by designing the two secondary windings L2-1 and L2-2 of each of inverter transformers 2 and 3 so as to have reverse winding with respect to each other, radiant noise originating in fluorescent tubes 15 and 16 driven in opposite phase relative to each other cancel each other out to reduce the noise of the overall fluorescent tube lighting apparatus, and thus the adverse effects of noise and the like imparted to other electronic components is also lessened.

As a method for indirectly connecting the inverter circuits, similarly to the case of FIG. 1(a), a configuration that directly connects together windings not used for self-excited oscillation, as illustrated in the dotted line part M of FIG. 1(b), is a simple and easy method since it can be implemented without increasing the number of component parts, however the "indirect connection method" according to this embodiment is not limited to the method shown in FIG. 1(b). Other methods that can be used in dotted line part M include, a configuration involving coupling through a transformer to utilize the induction effect thereof, as shown in FIG. 1(c), or a configuration in which coils CL1 and CL2 that are connected in parallel to tertiary windings not used in self-excited oscillation are disposed in proximity to each other, as shown in FIG. 1(d). These configurations are also included in the scope of the present invention.

In the present embodiment, two tertiary windings L3-1 and L3-2 are provided in one inverter transformer, however the number of such windings is not limited to two, and three or more may be provided as necessary. (For details, refer to the fifth embodiment (FIG. 5(c)).

Next, a fluorescent tube lighting apparatus according to the second embodiment of the present invention will be described referring to FIGS. 2(a) to 2(d).

Figure 2A:
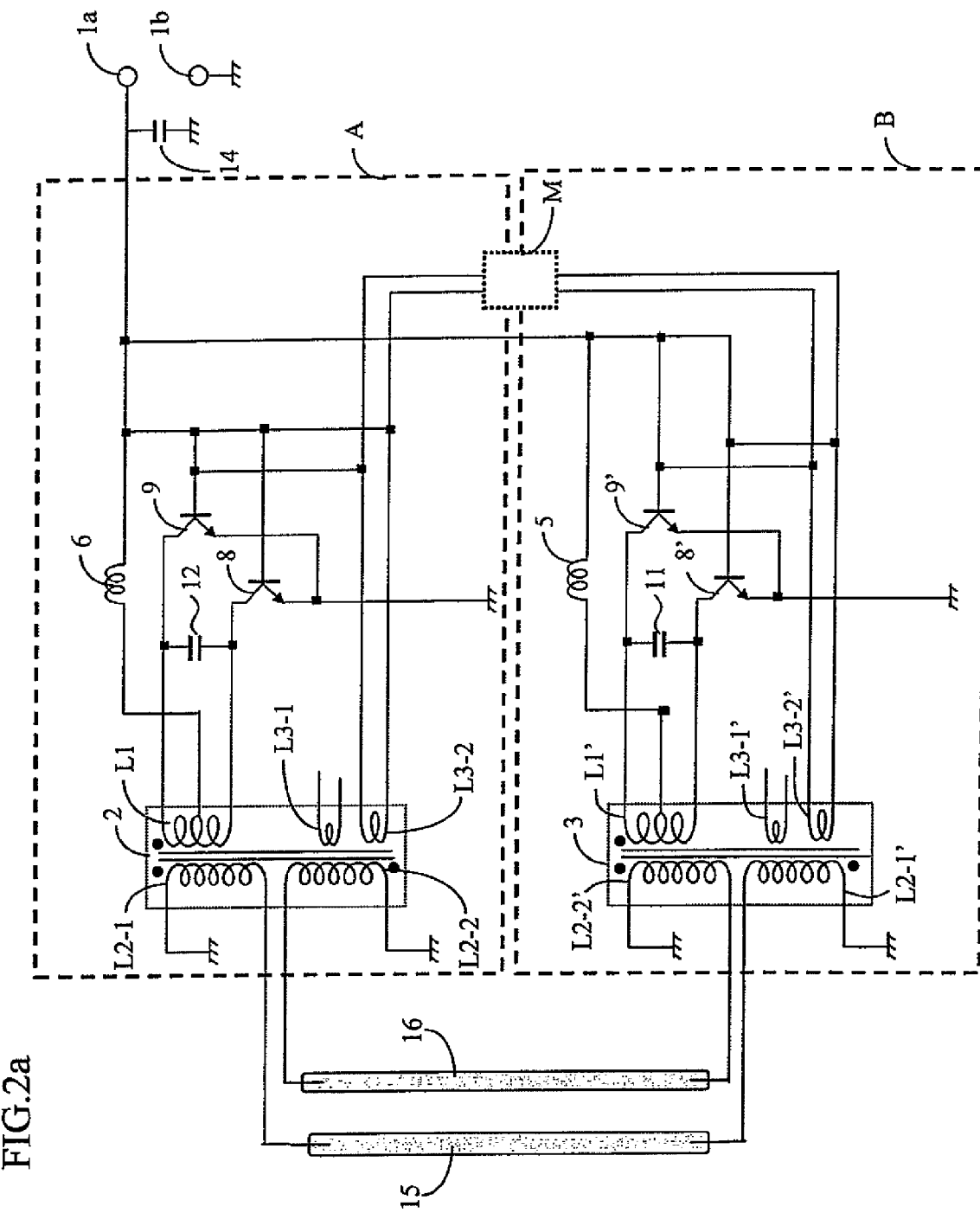

FIG. 2(a) shows the principal circuit diagram of the second embodiment of the fluorescent tube lighting apparatus of the present invention. The transformers employed in the inverter transformers are 2-in-1 transformers, and in order to apply voltages of opposite phases relative to each other to the two ends of the fluorescent tubes, the two ends of the tubes are respectively connected to one end of an inverter transformer. Furthermore, with respect to the tertiary winding used in self-excited oscillation of each inverter circuit, by connecting the windings to each other by means of coils or the like respectively provided in parallel, the two inverter circuits are indirectly connected.

The principal components of FIG. 2(a) are two inverter circuits A and B and fluorescent tubes 15 and 16. Inverter circuits A and B comprise a direct current power supply input terminal 1a, 2-in-1 inverter transformers 2 and 3, choke coils 5 and 6, transistors 8, 9, 8', and 9', resonance capacitors 11 and 12, a capacitor as a filter 14, and so forth. Of these, inverter transformers 2 and 3 comprise primary windings L1 and L1', secondary windings L2-1, L2-1', L2-2, and L2-2', and tertiary windings L3-1, L3-1', L3-2 and L3-2'. Further, in the present embodiment L3-2 and L3-2' are used as tertiary windings used in self-excited oscillation.

In the fluorescent tube lighting apparatus according to the present embodiment, as a means for indirectly coupling inverter circuit A and B, several embodiments may be mentioned as examples of the configuration within the dotted line part M. This embodiment is characterized in that two terminals tapped from each of the tertiary windings used in self-excited oscillation L3-2 and L3-2' of inverter circuit A and B are connected in parallel via coils or a transformer. An example of a more specific configuration includes, as shown in FIG. 2(b), a configuration in which connection is performed via two windings L4 and L4' of a transformer (coupling via transformer) within dotted line part M.

Further, as shown in FIG. 2(c), a configuration connecting via two transformers can also be employed. The advantages of utilizing two transformers as shown in FIG. 2(c) will be explained taking as an example a straight-tube type fluorescent light that extends linearly. In the case of employing only one transformer, as in FIG. 2(b), a transformer is equipped in only one of inverters A and B, and because the power of inverter A and that of inverter B do not become equal, a difference in brightness is liable to be generated between both ends of the fluorescent tube. However, by utilizing two transformers as shown in FIG. 2(c), inverters A and B can be provided with one transformer each, and thus power can be allocated equally to both inverter circuits A and B, enabling the balance of brightness of the right and left of the fluorescent tube to be maintained. In addition, in the two transformers according to the present embodiment, by making the number of turns of windings L5 and L5' of the output sides less than the number of turns of windings L4 and L4' of the input sides, an action works to lower the voltage applied to the output windings L5 and L5' (FIG. 2(c)). This enables the minimization of excess noise components among voltage components carried in each of inverter circuits A and B. Further, by employing a configuration whereby any one of windings L4, L5, L4', and L5' of the input sides and output sides is wound in reverse with respect to the other winding, noise components originating in each transformer cancel each other out, making it possible to stably oscillate each of inverter circuits A and B.

Further, as shown in FIG. 2(d), the windings for self-excited oscillation of inverter transformers 2 and 3 may be respectively connected in parallel to coils CL4 and CL4', and the coils CL4 and CL4' may be simply disposed in proximity to each other (coil proximity). According to this configuration also, the voltage phases of induced electromotive forces applied to coils CL4 and CL4' are attuned by magnetic fields originating from the core of each of coils CL4 and CL4', and because the alternating currents applied to the two ends of the fluorescent tube drive in opposite phase with respect to each other, as with the fluorescent tube lighting apparatus according to the first embodiment, driving of both ends of the fluorescent tube is enabled.

In a case where it is desired to drive inverter circuits A and B in opposite phase to each other, as shown in FIG. 2(b), a winding (L4 or L4') connected in parallel to the tertiary winding used in self-excited oscillation of each may be connected by reverse winding. Thereby, it is possible to simply drive both ends while achieving commonality of the component configurations and wiring patterns of inverter circuits A and B Furthermore, similarly to the fluorescent tube lighting apparatus according to the first embodiment of the present invention, it is also possible to configure the circuits so that the two outputs of the inverter transformer inside each inverter circuit are in opposite phase with respect to each other. In addition, a case where a 1-in-1 transformer is employed as the inverter transformer is also within the scope of the present invention. In such case, the inverter transformers connecting to both ends of the fluorescent tube can be a combination between one having a tertiary winding used in self-excited oscillation and one having a tertiary winding not used in self-excited oscillation. By adopting such a configuration, the same effect can be exerted as the case of the fluorescent tube lighting apparatus according to the above first embodiment.

Figure 3A:
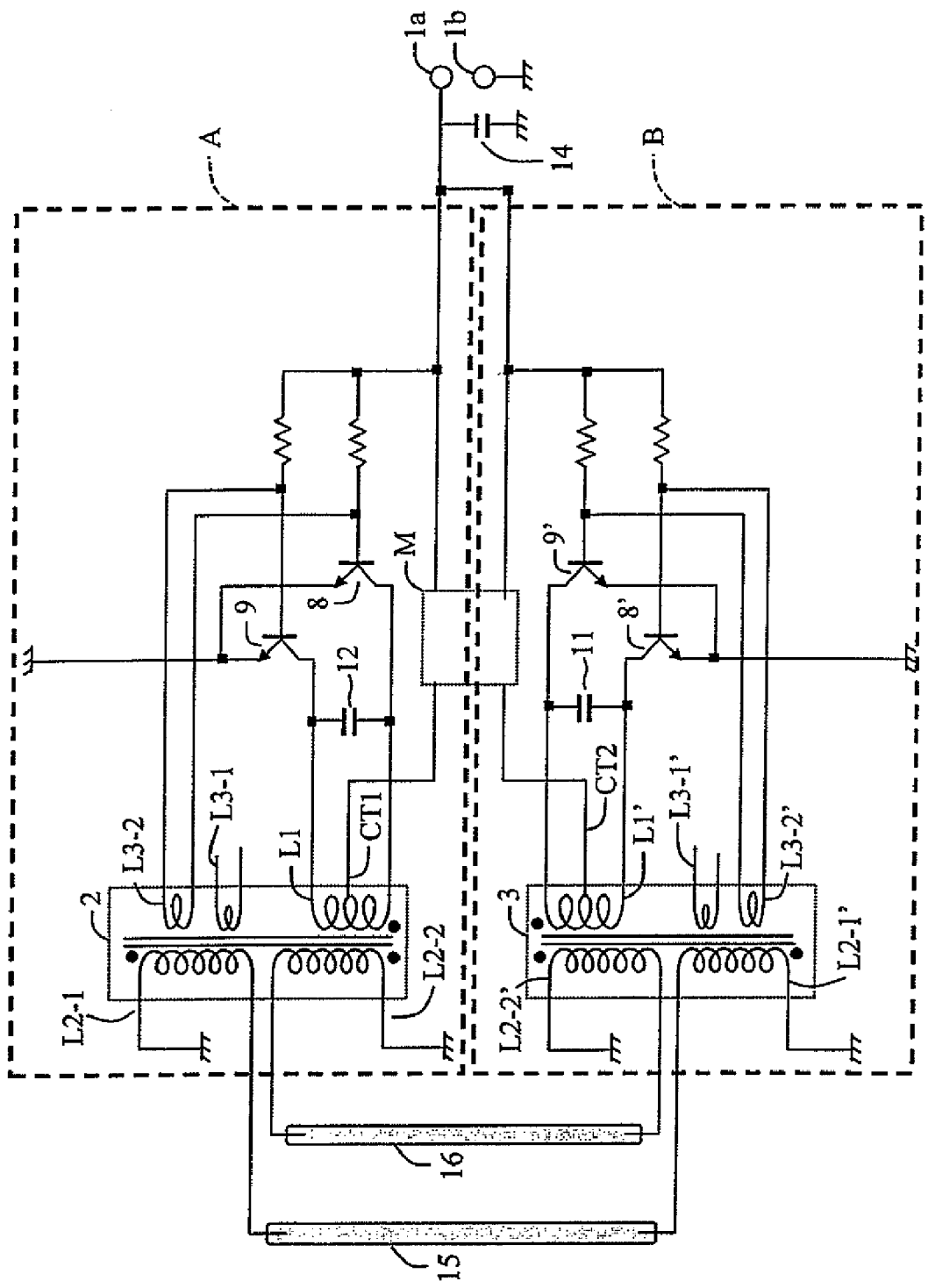
FIGS. 3a to 3e are circuit diagrams of the fluorescent tube lighting apparatus of the third embodiment of the present invention.

Next, a fluorescent tube lighting apparatus according to the third embodiment of the present invention will be explained referring to the drawings. FIG. 3(a) illustrates an example of the configuration of the fluorescent tube lighting apparatus according to the present embodiment. The configuration shown in FIG. 3(a) is characterized by having, as a means for synchronization of two inverter circuits A and B, a first configuration wherein choke coils (not shown in the figure) provided between input terminal 1a and each of center taps CT1 and CT2 tapped from each of primary windings L1 and L1' are indirectly connected together and the indirect connection is configured so that inverters A and B are driven in opposite phase relative to each other, and a second configuration wherein secondary windings L2-1 and L2-1', and L2-2 and L2-2' within inverter circuits A and B are respectively wound in reverse with respect to each other. Thus, the magnetic fields of the cores are cancelled out.

By comprising the above first configuration in the fluorescent tube lighting apparatus according to the present embodiment, voltages applied to the two ends of a fluorescent tube can be made to have opposite phases to each other without increasing the number of components (simple configuration). Further, by comprising the above second configuration, magnetic fields generated in the cores are eliminated. Thus, noise within the inverter circuits can be reduced.

For a fluorescent tube lighting apparatus according to other modification examples of the present embodiment, four configuration examples can be mentioned for the configuration within dotted line part M as a means for indirectly coupling inverter circuits A and B. These four configuration examples are characterized by comprising, as a means for synchronization of inverter circuits A and B, a configuration that indirectly connects together the choke coils for each center tap so that they can be mutually associated to enable synchronization.

Figure 3B:
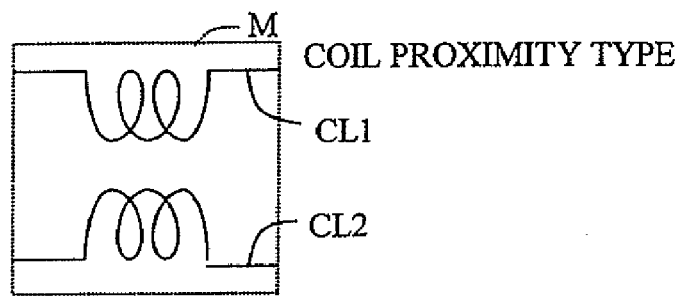
Figure 3C:
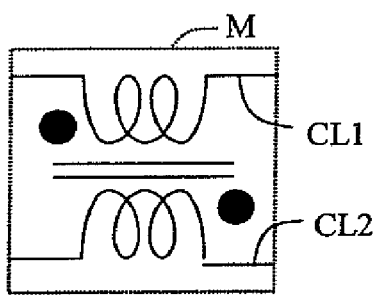
Figure 3D:
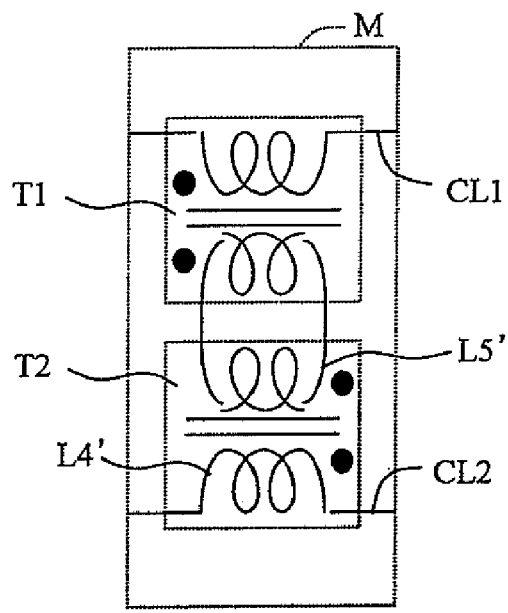

More specifically, an example of an indirect connection configuration is one having a coil proximity type configuration achieved by disposing coils CL1 and CL2 in proximity to each other inside dotted line part M, as shown in FIG. 3(b) (coil proximity type). Further, as shown in FIG. 3(c), a configuration involving a transformer that indirectly connects the inverter circuits via a transformer is also possible. According to this configuration, the number of components can be decreased from the configuration in FIG. 3(b) having two coils to a configuration having one transformer. In addition, as shown in FIG. 3(d), a configuration connecting the inverter circuits via two transformers T1 and T2 is also possible. The configuration shown in FIG. 3(d) (coupling via transformers) offers an advantage, for example, in a case in which inverter circuits A and B are disposed at a distance from each other in order to light a straight-tube type fluorescent tube, where if either of inverters A and B is provided with one transformer the power balance between the two inverters will be lost and brightness at the two ends of the fluorescent tube will not become equal. In such a case, by using two transformers to provide one transformer in each of the two inverters it is possible to allocate power equally to the two inverter circuits A and B, and the balance in brightness between the right and left sides of the fluorescent tube can be maintained. Accordingly, the configuration shown in FIG. 3 (d) represents the technical effect thereof in the case of driving both ends of a straight-tube type light that extends linearly.

Further, regarding the two transformers according to the present embodiment, by making the number of turns of winding L5' of the output side less than the number of turns of winding L4' of the input side, an action takes effect to lower the voltage applied to the output winding L5', enabling the minimization of excess noise components among voltage components carried to the two inverter circuits A and B. In addition, by employing a configuration such that the windings between the input sides and output sides are wound in reverse with respect to each other, noise components originating in each of the transformers cancel each other out, making it possible to stably oscillate both of inverter circuits A and B.

Figure 3E:
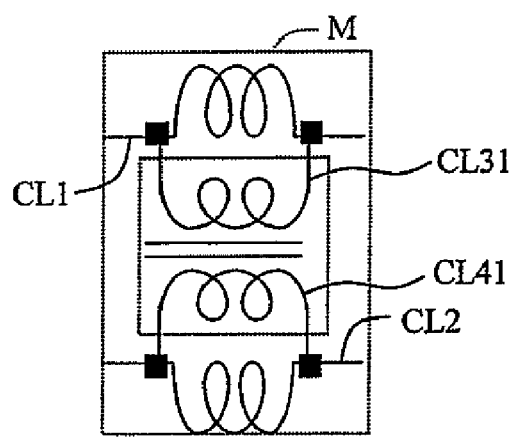

Further, with the type of configuration shown in FIG. 3(e), it is possible to decrease the windings used in indirect connection and perform coupling by weak inductive coupling. In the configuration shown in FIG. 3(e), two windings CL31 and CL41 form a pair to constitute a transformer. By adopting this configuration, synchronization can be performed while minimizing noise generated in each of the inverter circuits.

The method of indirectly connecting the inverter circuits may be an opposite phase method or in-phase method, as long as the configuration is one applying voltages of opposite phases to the two ends of the fluorescent tube, and such methods are included in the scope of the present invention.

Figure 4:
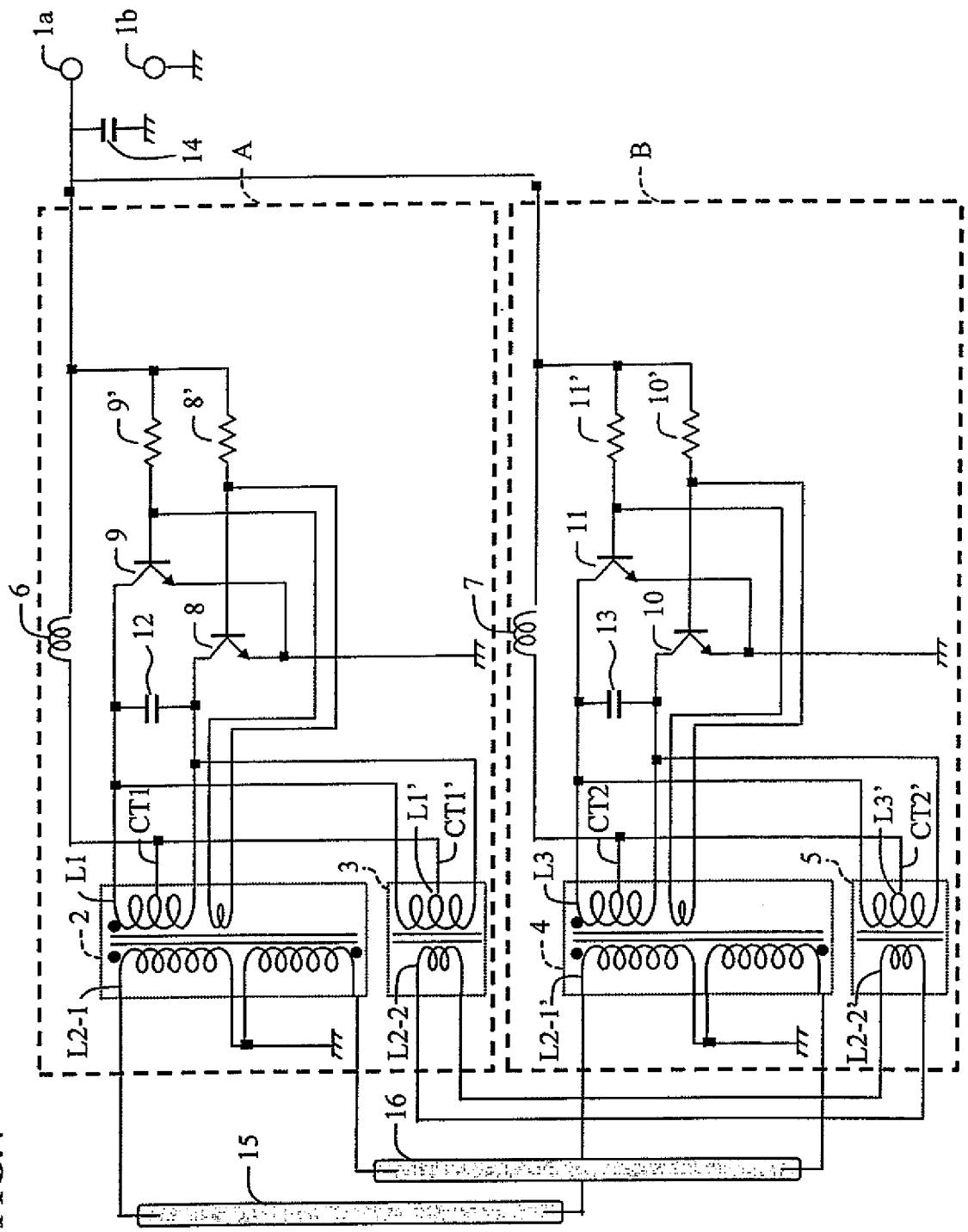
FIG. 4 is a circuit diagram of the fluorescent tube lighting apparatus of the fourth embodiment of the present invention.

Next, a fluorescent tube lighting apparatus according to the fourth embodiment of the present invention will be described referring to the drawings. FIG. 4 illustrates a configuration example of the fluorescent tube lighting apparatus according to the present embodiment for a case using 2-in-1 transformers. As shown in FIG. 4, the fluorescent tube lighting apparatus according to the present embodiment has a configuration indirectly connecting inverter A and inverter B via step-down transformers 3 and 5 having primary windings L1' and L3'.

In both inverter A and B, the primary windings L1' and L3' of step-down transformers 3 and 5 in which the voltage from the secondary windings is made less than the voltage of the primary windings are respectively connected in parallel to primary windings L1 and L3 of the inverter transformers (step-up transformers). Transformers 3 and 5 are comprised of primary windings L1' and L3' and secondary windings L2-2 and L2-2' to lower the voltage from each of the primary windings. The embodiment is characterized in that the secondary windings L2-2 and L2-2' are connected to each other indirectly or directly.

In the fluorescent tube lighting apparatus according to the present embodiment, as a means for indirect connection, transformers comprising one part of oscillation circuits respectively tapped from each of inverter circuits A and B are indirectly connected via secondary windings L2-2 and L2-2' of transformers 3 and 5 having primary windings L1' and L3'. More specifically, a configuration is employed whereby the secondary windings L2-2 and L2-2' of the transformers 3 and 5 having primary windings L1' and L3' are connected such that the phases of inverter circuits A and B are inverted with respect to each other. That is, the present modification example is characterized in that secondary windings of a transformer, that are essentially a means to be connected to both ends of a fluorescent tube to boost voltage, are not used in the power supply of the fluorescent tube, and are used for indirect connection.

By employing the above configuration, in each of primary windings L1' and L3' of step-down transformers 3 and 5, similarly to primary windings L1 and L3 of step-up transformers 2 and 4, the direction of current flowing from center taps CT1' and CT2' continually fluctuates according to the switching conditions of transistors 8-11, and by fluctuations of the magnetic flux of the cores of the transformers produced as a result thereof, alternating voltage waveforms are generated in secondary windings L2-2 and L2-2' of step-down transformers 3 and 5. Thus, by coupling together these two secondary windings as shown in FIG. 4, the phases of the inverter circuits are synchronized in opposite phase with respect to each other and high voltages of opposite phases are generated in secondary windings L2-1 and L2-1' of step-up transformers 2 and 4. Therefore, by connecting these two terminals to the two ends of fluorescent tube 15 it is possible to drive fluorescent tube 15 at a stable frequency. The same principle applies also for fluorescent tube 16.

According to the above configuration, since operation is performed such that the direction of current flowing via center tap CT1 in primary winding L1 of step-up transformer 2 is opposite to the direction of current flowing via center tap CT2 in primary winding L3 of step-up transformer 4, alternating currents of opposite phases with respect to each other can be generated between secondary winding L2-1 of step-up transformer 2 and secondary winding L2-1' of step-up transformer 4 that are wound in phase, without producing a distortion in the voltage waveforms thereof.

Therefore, when providing a pair of inverter circuits at the two ends of fluorescent tubes 15 and 16 and driving the fluorescent tubes in parallel, because voltages generated in the secondary windings of each inverter circuit connected to the fluorescent tubes can be synchronized in opposite phase with respect to each other, differential voltages can be applied at an equal size at both ends of each fluorescent tube, and thus brightness can be equalized even for a fluorescent tube that is long in length.

In the above example, secondary windings are used to connect the step-down transformers together, however the step-down transformers may be further provided with a feedback winding (tertiary winding), and the feedback windings connected together.

A method to couple together the secondary windings of step-down transformers 3 and 5 is, as described above, not limited to a direct connection, and coupling may be performed via a coil or transformer or the like, and such methods belong within the scope of the present invention.

Further, the method of indirectly connecting the inverter circuits may involve a connection that is either in-phase or in opposite phase, as long as the configuration is one whereby voltages of opposite phases relative to each other are applied to the two ends of the fluorescent tubes, and such methods are included in the scope of the present invention.

Next, a fluorescent tube lighting apparatus according to the fifth embodiment of the present invention will be explained referring to drawings 5(a) to 5(d). The fluorescent tube lighting apparatus according to the present embodiment is characterized by having a first configuration using a means for indirect connection of inverter circuits at both ends of a fluorescent tube and a second configuration using a means for indirect connection of fluorescent tube lighting apparatuses.

Figure 5A:
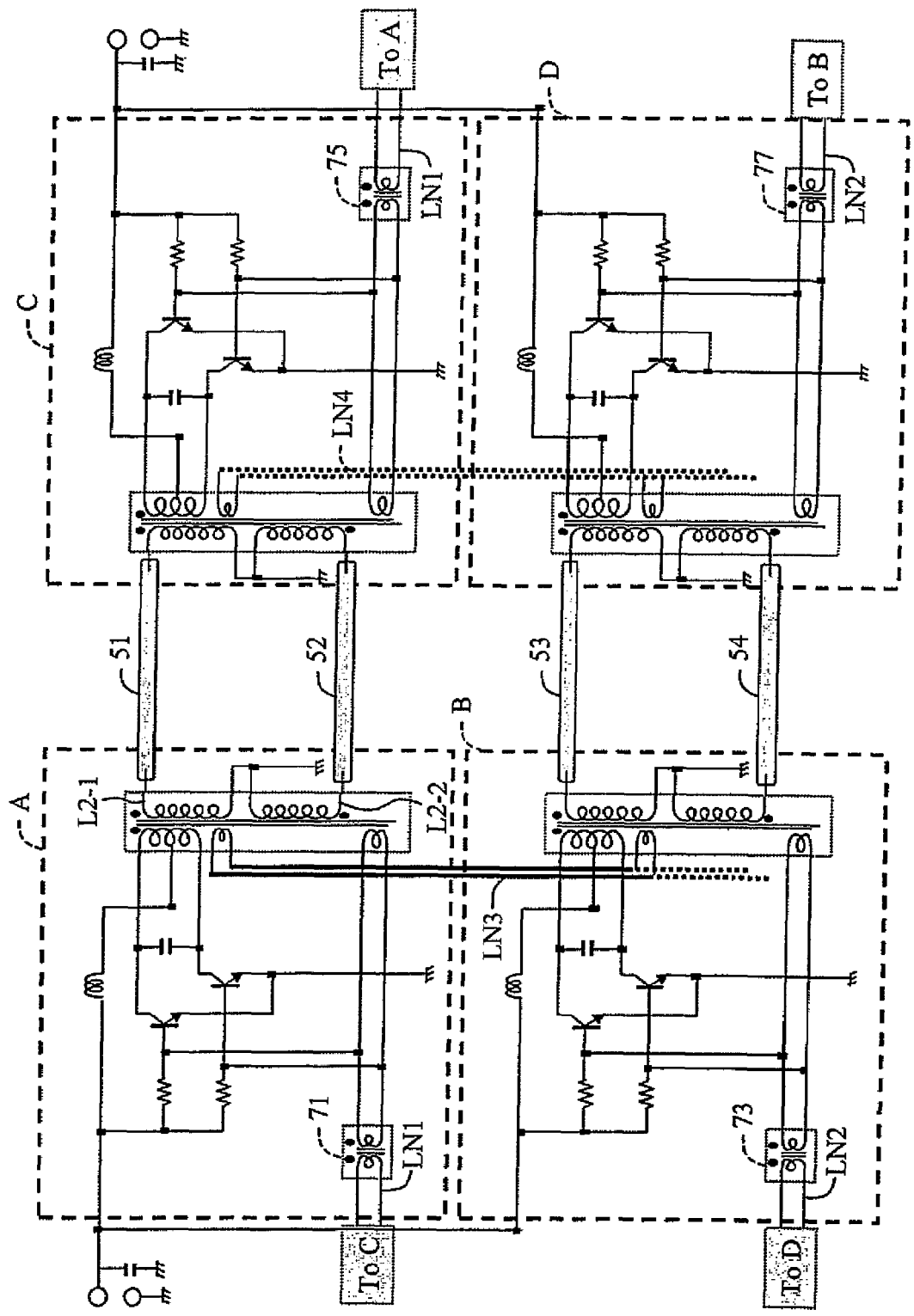
FIGS. 5a to 5d are circuit diagrams of the fluorescent tube lighting apparatus of the fifth embodiment of the present invention.

In the fluorescent tube lighting apparatus illustrated in FIG. 5(a), the above first and second configurations are as follows. That is, the first configuration as a means for indirect connection between inverter circuits at two ends of a fluorescent tube refers to a means LN1 or LN2 that connects a transformer 71 or 73 having a winding connected in parallel to a tertiary winding used in self-excited oscillation of an inverter circuit A or B with a transformer 75 or 77 having a winding similarly connected in parallel to a tertiary winding used in self-excited oscillation of an inverter circuit C or D, by means of a winding disposed facing the aforementioned winding. Meanwhile, the second configuration using a means for indirect connection of fluorescent tube lighting apparatuses comprises at least one of either a means LN3 connecting together the two ends of tertiary windings not used in self-excited oscillation of inverter circuits A and B, and a means LN4 connecting together the two ends of tertiary windings not used in self-excited oscillation of inverter circuits C and D.

Regarding the connection method of LN1 or LN2 of the above first configuration, the connection may be such that driving is performed whereby the phases of inverter circuits A and C, or B and D are either in phase or in opposite phase relative to each other, as long as they are connected such that the voltages applied to the two ends of each of fluorescent tubes 51-54 are in opposite phases relative to each other.

Regarding the connection method of LN3 or LN4 of the above second configuration also, the connection may be such that driving is performed whereby the phases of inverter circuits A and B are either in phase or in opposite phase relative to each other, and it is preferable that the connection is such that the phases of alternating voltages applied to fluorescent tubes 51 to 54 are inverted per single fluorescent tube or per the number of fluorescent tubes of a single fluorescent tube lighting apparatus. More specifically, for example, in a case where the phases of alternating voltages applied to fluorescent tubes 51 and 52 that are inside a single fluorescent tube lighting apparatus are opposite relative to each other, if means for indirect connection LN3 or LN4 is connected so that inverter circuits A and B, or C and D are driven in phase, the phases of alternating voltages applied to fluorescent tubes 51 to 54 are always inverted per single fluorescent tube. Conversely, when the phases of alternating voltages applied to fluorescent tubes 51 and 52 that are inside a single fluorescent tube lighting apparatus are in phase with each other, if means for indirect connection LN3 or LN4 is connected so that inverter circuits A and B, or C and D are driven in opposite phase, the phases of alternating voltages applied to fluorescent tubes 51 to 54 are inverted per two fluorescent tubes, in other words, the phases are inverted per the number of fluorescent tubes of a single fluorescent tube lighting apparatus. By inverting the phases of alternating voltages applied to fluorescent tubes per single fluorescent tube or per the number of fluorescent tubes of a single fluorescent tube lighting apparatus in this manner, it is possible to balance out unwanted radiant noise generated from the fluorescent tubes, so that a fluorescent tube lighting apparatus with low noise can be provided.

As a specific method for sequentially inverting the phases of alternating voltages applied to fluorescent tubes, in addition to the above method, a method is also possible whereby a connection terminal to a fluorescent tube of a secondary winding of a transformer and a ground terminal are interchanged sequentially for each secondary winding. Accordingly, for the above means for inverting the phases of fluorescent tubes, a method wherein the two secondary windings L2-1 and L2-2 of each inverter circuit A to D are wound in reverse with respect to each other is not always necessary, and a method whereby the windings are wound in the same direction may be used, and such method is included in the scope of the present invention.

Regarding these means for indirect connection LN1 to LN4, as long as one of the means for indirect connection is provided a problem does not arise if any of the others is lacking since inverter circuits A to D can be synchronized, and a configuration may be employed that as necessary comprises all four connection means, such as to reinforce synchronization between the inverter circuits.

According to the fluorescent tube lighting apparatus having the above configuration, for example, since it is also possible to reduce noise traveling to a liquid crystal panel from a fluorescent tube, the scope of application and effects thereof are widened and increased still further.

Figure 5B:
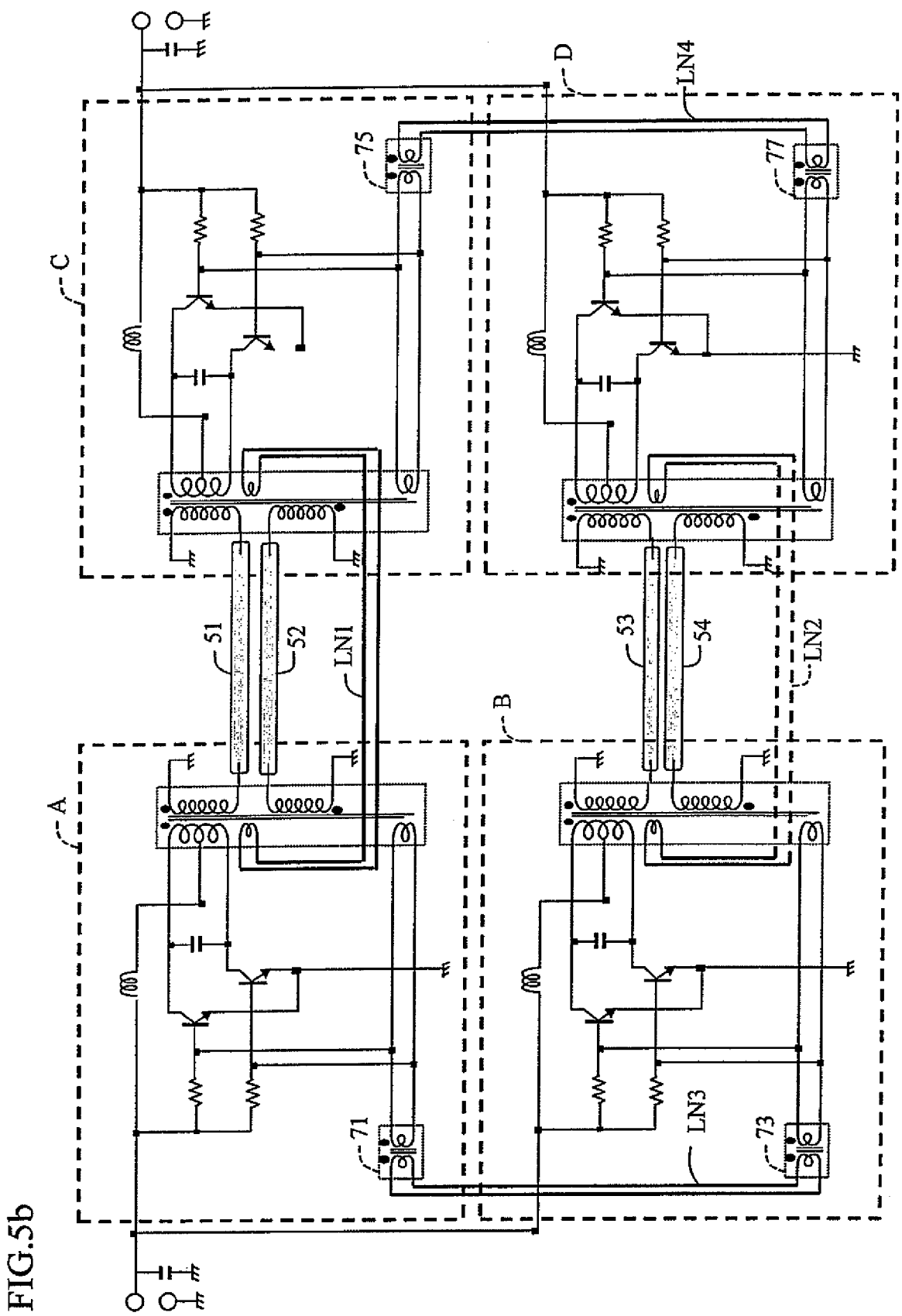

Next, a fluorescent tube lighting apparatus according to a first modification example of the present embodiment will be described referring to FIG. 5(b). In the fluorescent tube lighting apparatus according to the first modification example of the present embodiment, a first configuration as a means for indirect connection of inverter circuits at both ends of a fluorescent tube refers to a means LN1 connecting together the two ends of tertiary windings not used in self-excited oscillation of inverter circuits A and C, and a means LN2 connecting together the two ends of tertiary windings not used in self-excited oscillation of inverter circuits B and D. Meanwhile, a second configuration using a means for indirect connection of fluorescent tube lighting apparatuses comprises a means LN3 or LN4 that connects a transformer 71 or 75 having a winding connected in parallel to a tertiary winding used in self-excited oscillation of an inverter circuit A or C with a transformer 73 or 77 having a winding similarly connected in parallel to a tertiary winding used in self-excited oscillation of an inverter circuit B or D, by means of a winding disposed facing the aforementioned winding. More specifically, the configuration is one whereby the means of the first configuration and second configuration according to the aforementioned original embodiment (FIG. 5(a)) are respectively interchanged. Accordingly, the effect thereof is the same as the effect of the embodiment of FIG. 5(a).

Further, in the present first modification example, as with the previous embodiment a decision regarding whether to have a means for indirect connection operate in opposite phase or in phase may be taken in accordance with the inversion circumstances of the phases of alternating voltages applied to fluorescent tubes 51 to 54, and a connection means may be made to operate either in phase or in opposite phase as appropriate. According to a fluorescent tube lighting apparatus having this type of configuration, since unwanted radiant components originating from the fluorescent tubes can be balanced out between the fluorescent tubes, it is possible to reduce noise traveling from a fluorescent light to, for example, a liquid crystal panel.

Regarding these means for indirect connection LN1 to LN4, as long as one of the means for indirect connection is provided a problem does not arise if any of the others is lacking since inverter circuits A to D can be synchronized, and a configuration may be employed that, as necessary, comprises all four connection means, such as to reinforce synchronization between the inverter circuits.

Figure 5C:
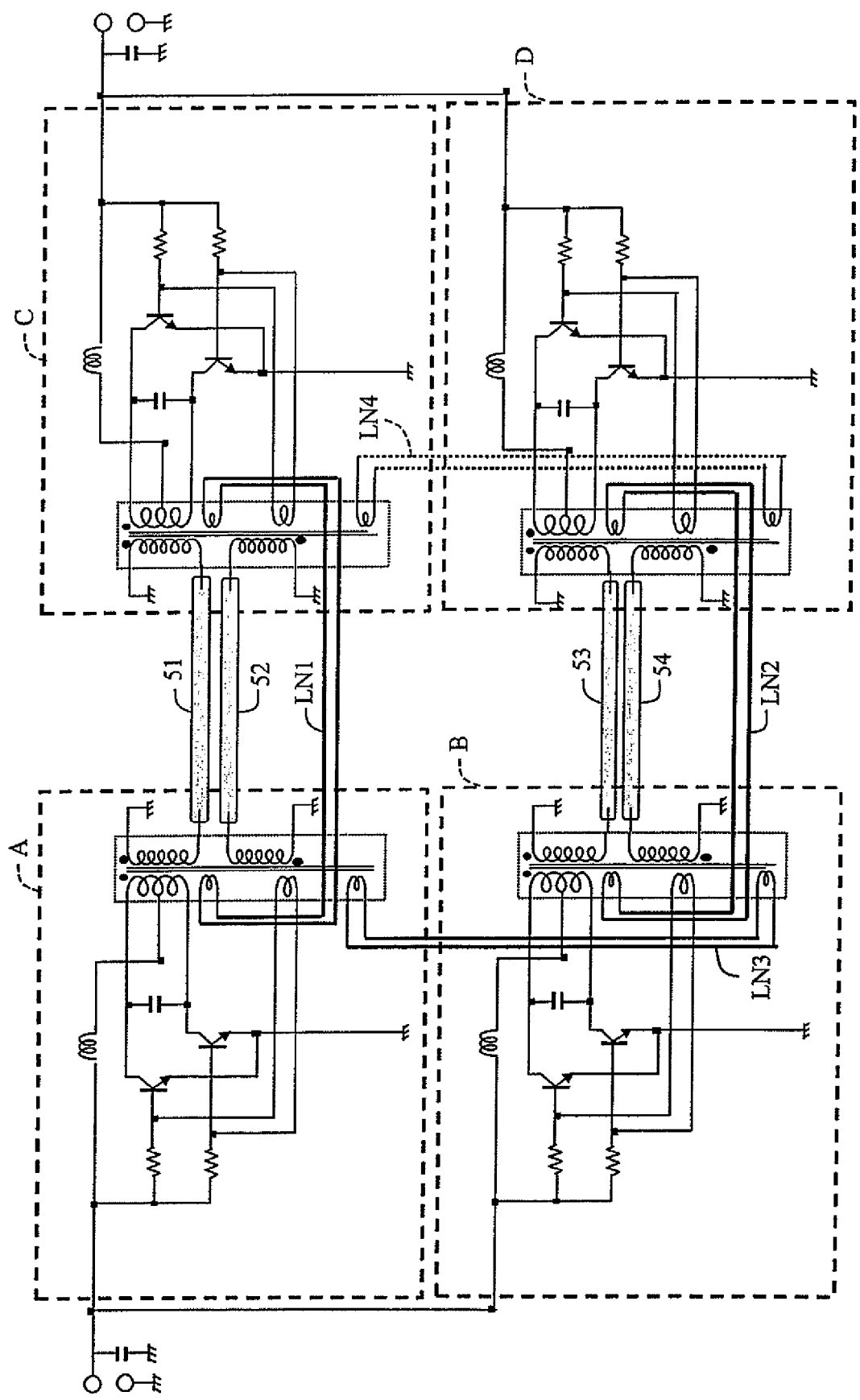

Next, a fluorescent tube lighting apparatus according to a second modification example of the present embodiment will be described referring to FIG. 5(c). In the fluorescent tube lighting apparatus according to the second modification example of the present embodiment three tertiary windings are provided in the inverter transformers, and since one of those is used as a tertiary winding used in self-excited oscillation, the remaining two can be used as tertiary windings not used in self-excited oscillation. Therefore, both the first configuration that is a means for indirectly connecting together inverter circuits at both ends of a fluorescent tube and the second configuration that uses a means for indirect connection of fluorescent tube lighting apparatuses can use these tertiary windings not used in self-excited oscillation. Accordingly, the first configuration as a means for indirectly connecting together inverter circuits at the two ends of a fluorescent tube refers to a means LN1 connecting together the two ends of tertiary windings not used in self-excited oscillation of inverter circuits A and C, and a means LN2 connecting together the two ends of tertiary windings not used in self-excited oscillation of inverter circuits B and D. Meanwhile, the second configuration that uses a means for indirect connection of fluorescent tube lighting apparatuses comprises a means LN3 connecting together the two ends of tertiary windings not used in self-excited oscillation of inverter circuits A and B, and a means LN4 connecting together the two ends of tertiary windings not used in self-excited oscillation of inverter circuits C and D. Although the above means are different to those of FIG. 5(a), since the purpose of each means for indirect connection is respectively the same as those in FIG. 5(a), the effect is the same as in the embodiment illustrated in FIG. 5(a).

Further, in the present second modification example, as with the previous embodiment a decision regarding whether to have a means for indirect connection operate in opposite phase or in phase may be taken in accordance with the inversion circumstances of the phases of alternating voltages applied to fluorescent tubes 51 to 54, and a connection means may be made to operate either in phase or in opposite phase as appropriate. According to a fluorescent tube lighting apparatus having this type of configuration, since unwanted radiant components originating from the fluorescent tubes can be balanced out between the fluorescent tubes, it is possible to reduce noise traveling from a fluorescent light to, for example, a liquid crystal panel.

Regarding these means for indirect connection LN1 to LN4, as long as one of the means for indirect connection is provided a problem does not arise if any of the others is lacking since inverter circuits A to D can be synchronized, and a configuration may be employed that, as necessary, comprises all four connection means, such as to reinforce synchronization among the inverter circuits.

Next, a fluorescent tube lighting apparatus according to a third modification example of the present embodiment will be described referring to FIG. 5(d). In the fluorescent tube lighting apparatus according to the third modification example of the present embodiment, the first configuration as a means for indirectly connecting together inverter circuits at the two ends of a fluorescent tube refers to a means LN1 connecting together the two ends of tertiary windings not used in self-excited oscillation of inverter circuits A and C, and a means LN2 connecting together the two ends of tertiary windings not used in self-excited oscillation of inverter circuits B and D. Meanwhile, the second configuration that uses a means for indirect connection of fluorescent tube lighting apparatuses comprises a means 90 or 90' that performs indirect connection by means of choke coils of inverter circuits A and B, or C and D. Although the above means are different to those of FIG. 5(a), since the purpose of each indirect connection means is respectively the same as those in FIG. 5(a) (90 and 90' correspond to LN3 and LN4), the effect is the same as in the embodiment illustrated in FIG. 5(a).

For the present third modification example also, as with the previous embodiment, a decision regarding whether to have a means for indirect connection operate in opposite phase or in phase may be taken in accordance with the inversion circumstances of the phases of alternating voltages applied to fluorescent tubes 51 to 54, and a connection means may be made to operate either in phase or in opposite phase as appropriate. According to a fluorescent tube lighting apparatus having this type of configuration, since unwanted radiant components originating from the fluorescent tubes can be balanced out between the fluorescent tubes, it is possible to reduce noise traveling from a fluorescent light to, for example, a liquid crystal panel.

Figure 5D:
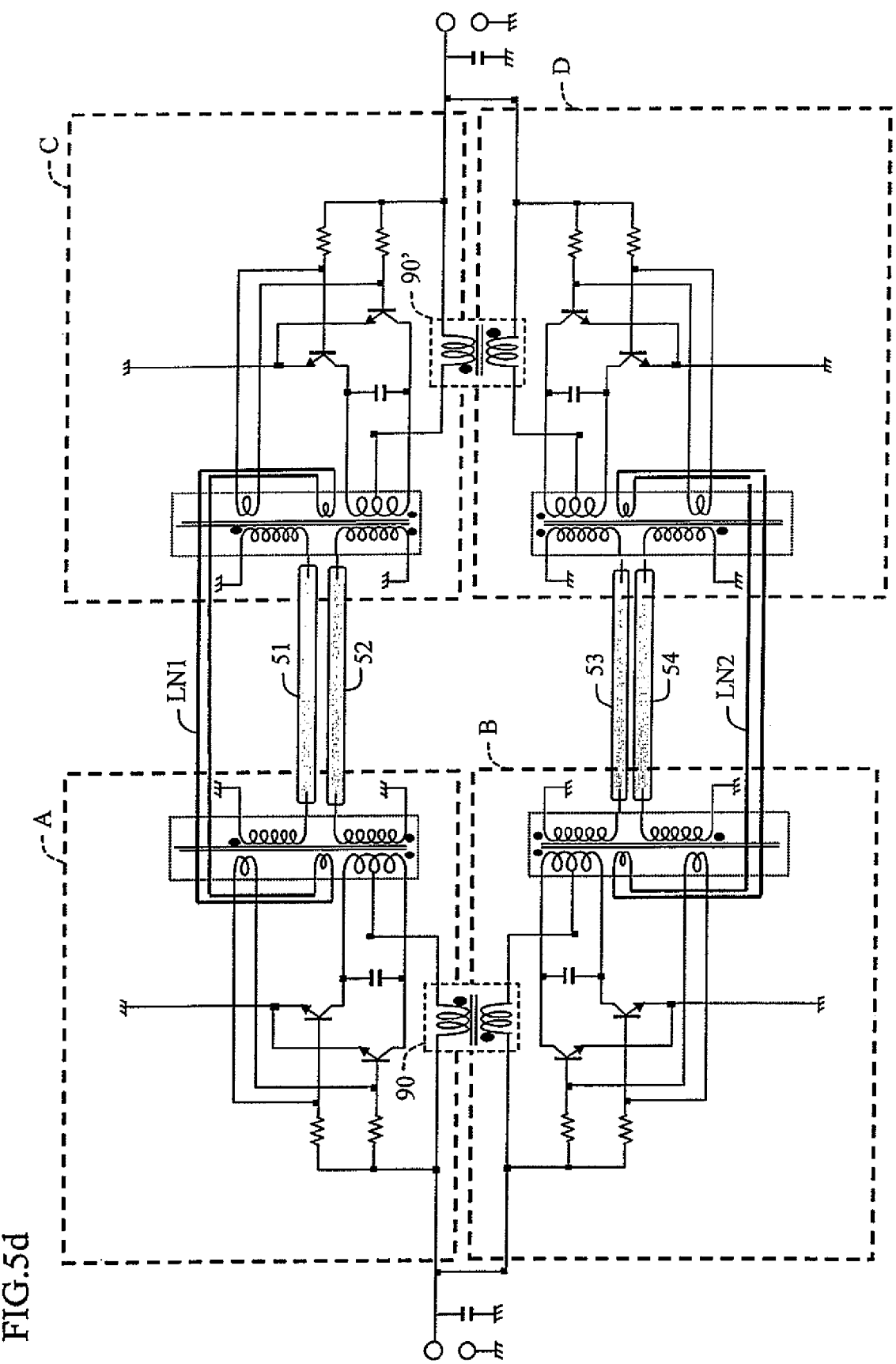

Regarding the means for indirect connection 90 or 90' in FIG. 5(d), as the method for connecting inverter circuits A and B, or C and D, the configuration used employs transformed coupling using each winding of the transformer as a choke coil, however, a configuration may be employed according to an example similar to the above third embodiment (FIG. 3 (b)-(e)).

Regarding these means for indirect connection LN1, LN2, 90, and 90', as long as one of the means for indirect connection is provided a problem does not arise if any of the others is lacking since inverter circuits A to D can be synchronized, and a configuration may be employed that, as necessary, comprises all four connection means, such as in order to reinforce synchronization among the inverter circuits.

The fifth embodiment is described above. However, both the first configuration as a means for indirectly connecting together inverter circuits at both ends of a fluorescent tube and the second configuration as a means for indirectly connecting fluorescent tube lighting apparatuses utilize the principle whereby, using various windings inside the inverter circuits, the resonance frequency of each inverter circuit is resonated for synchronization as a result of resonance frequencies generated in each of the inverter circuits being transmitted to each other via magnetic flux originating from induced electromotive force generated in the windings. Accordingly, the aforementioned various windings can be used in either of the above first and second configurations, and this feature is encompassed by the present invention. In addition, regarding the above second configuration, by connecting in parallel tertiary windings not used in self-excited oscillation or the like provided in three or more fluorescent tube lighting apparatuses, the three or more fluorescent tube lighting apparatuses can be indirectly connected, with there being no limitation on the number of fluorescent tube lighting apparatuses, and this feature is encompassed by the present invention. Further, there is no particular limitation on the number of fluorescent tubes that a single fluorescent tube lighting apparatus can comprise. In such case also, regarding selection of an in-phase connection or opposite phase connection for the phases of fluorescent tube lighting apparatuses in the above second configuration, either may be selected as long as indirect connection is performed such that the phases of voltages applied to the fluorescent tubes are inverted per each fluorescent tube or per the number of fluorescent tubes comprised by a single fluorescent tube lighting apparatus, and this is also within the scope of the present invention.

When using a tertiary winding for indirect connection, the number of turns of the tertiary winding is less than the number of turns of a tertiary winding used in self-excited oscillation. For example, in FIG. 1(a), the number of turns of tertiary winding L3-1 used for indirect connection may be low, for example, about 0.5 to 3 turns. On the other hand, the number of turns of tertiary winding L3-2 used for self-excited oscillation is, for example, about the number of turns required to switch ON the base side of transistors 8 and 9. By making the respective number of turns different in this manner, the control of voltages applied to a fluorescent light is possible even for low voltages, enabling the effects of noise to be reduced. In addition, as shown in FIG. 1(e), with regard to tertiary windings inside the same transformer, the number of turns can be changed in the same manner as the case of FIG. 1(a) for a tertiary winding used for self-excited oscillation and a tertiary winding used for indirect connection.

The embodiments illustrated up to now as means for indirect connection all relate to coupling between windings of the same parts of inverter circuits, and the definition of a means for indirect connection refers to coupling by an inductive coupling effect, and does not involve movement of a carrier between inverter circuits. Therefore, coupling by a suitable combination of the various windings illustrated above (i.e., tertiary winding not used in self-excited oscillation, choke coil, secondary winding not used in power supply to a driven unit, winding connected in parallel to a tertiary winding used in self-excited oscillation, and the like) that can be indirectly connected is also considered to be an indirect connection. For example, a connection may be a direct connection between a "tertiary winding not used in self-excited oscillation" and a "secondary winding not used in power supply to a driven unit", or may be transformed coupling between a "choke coil" and a "winding connected in parallel to a tertiary winding used in self-excited oscillation".

As an application example of the fluorescent tube lighting apparatus described in the above first to fifth embodiments, an example will be described of an application to a backlight apparatus used in a display device requiring uniform planar light from a rear surface such as, for example, a translucent liquid crystal display.

-Embodiment as a Backlight-

Backlight apparatuses according to the present embodiment can be roughly classified into two types. One type is a so-called "direct backlight", in which fluorescent tubes are provided opposite the position of a display screen and light emitted from the fluorescent tubes is diffused by a light diffuser to illuminate the display screen as uniform planar light. The other type of backlight apparatus is a so-called "side-edge backlight", in which fluorescent tubes are provided at the sides of a display screen and light from the fluorescent tubes is converted by a light-guiding plate into uniform planar light to illuminate the display screen.

The fluorescent tube lighting apparatus described in the first to fifth embodiments can be applied to both of the above types of backlight apparatus. Hereunder, as a sixth embodiment, an example of application to a direct backlight apparatus will be described referring to FIG. 6 to FIG. 8, and as a seventh embodiment an example of application to a side-edge backlight apparatus will be described referring to FIG. 9 and FIG. 10.

Figure 6:
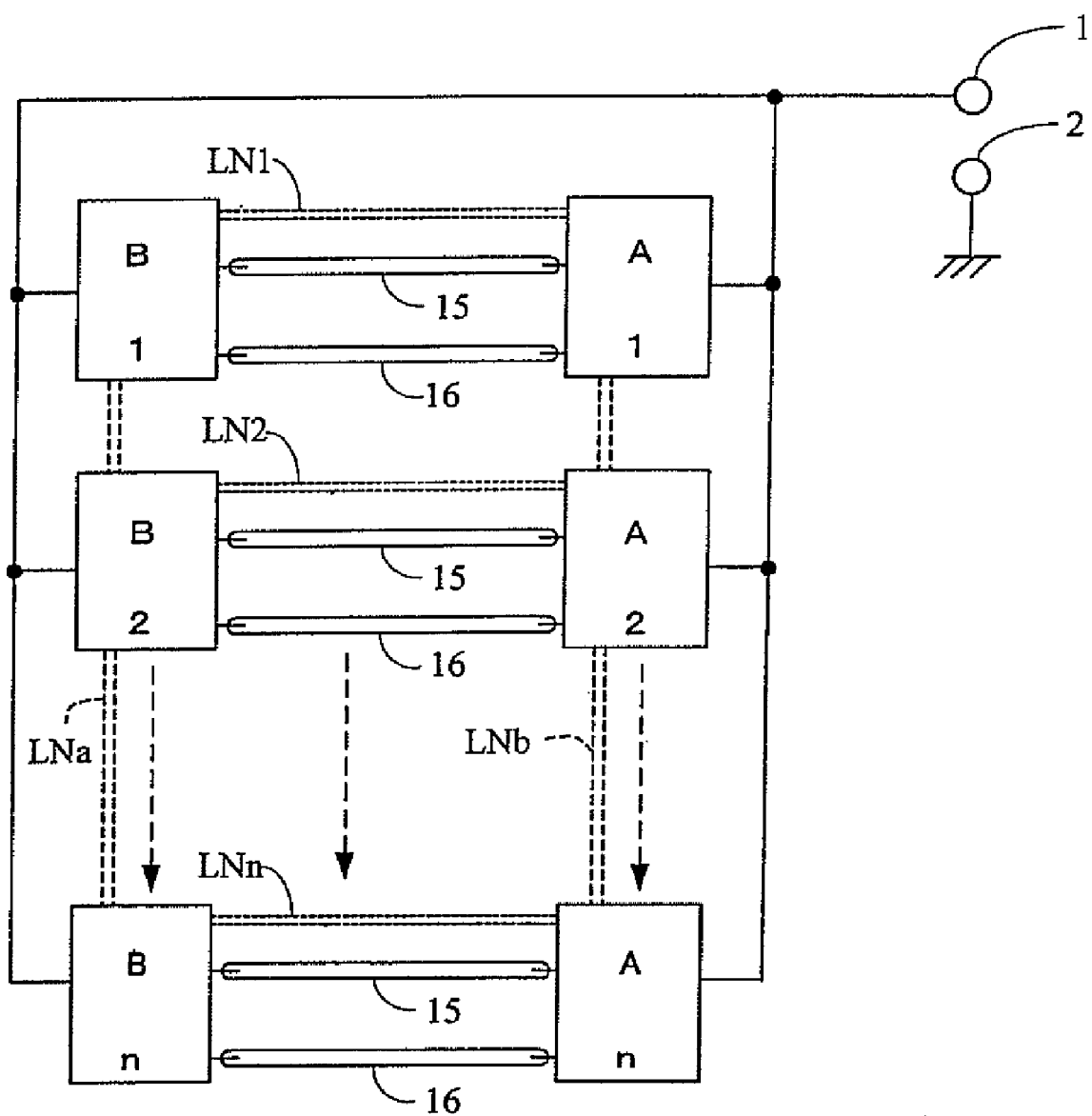
FIG. 6 illustrates an example of connections of a fluorescent tube lighting apparatus having a plurality of the fluorescent tube lighting apparatus of the present invention juxtaposed in sequence.

FIG. 6 illustrates a configuration example of circuitry used in a direct backlight apparatus according to the sixth embodiment of the present invention, and shows a configuration in which a plurality of the fluorescent tube lighting apparatus according to the first embodiment of the present invention are provided to simultaneously drive a plurality of fluorescent tubes synchronously. In FIG. 6, n represents a natural number, where n is selected by an engineer as an optimal value in accordance with a usage condition (that is, the number of fluorescent tubes).

Figure 7:
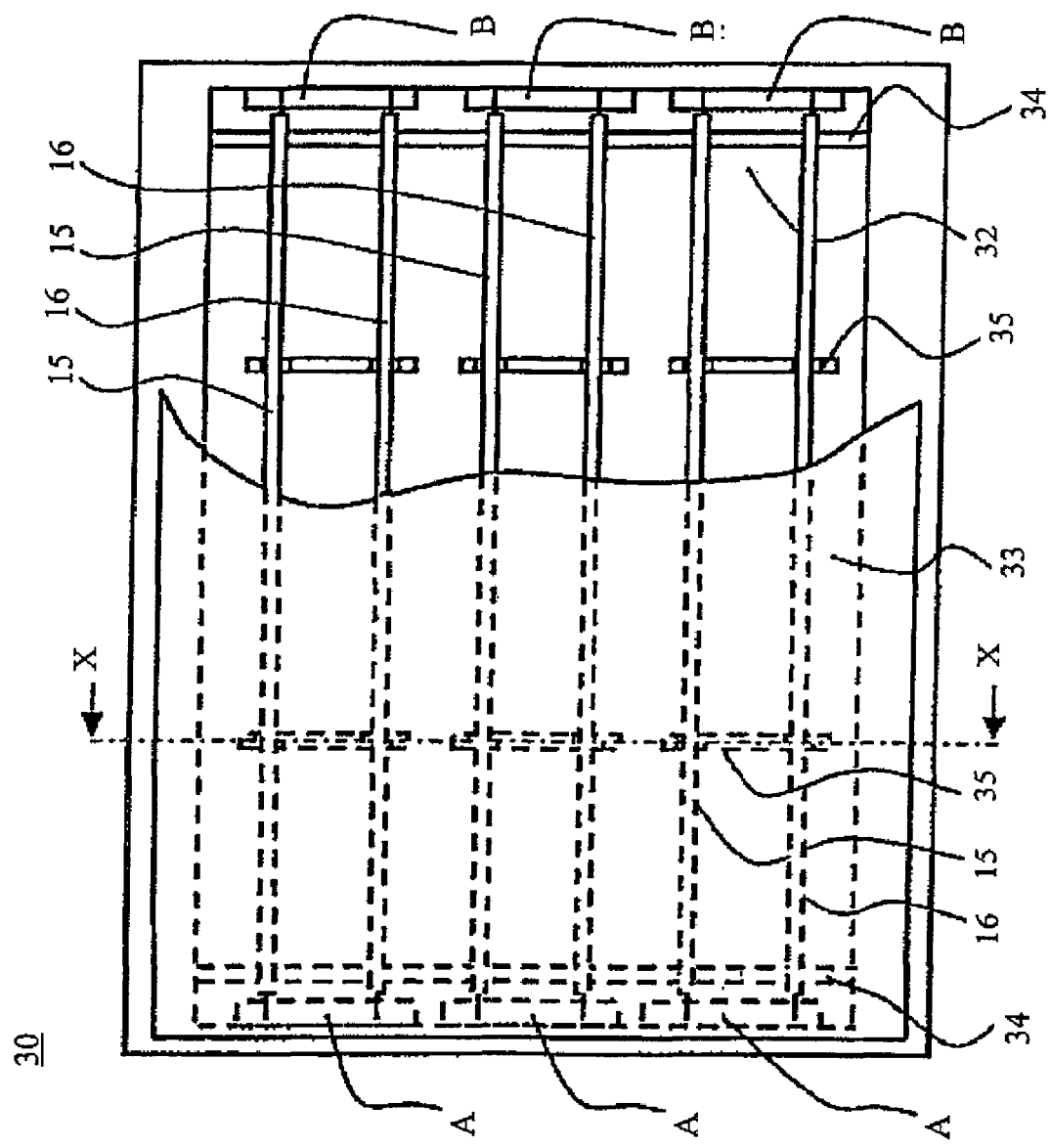
FIG. 7 is a front elevation of the backlight apparatus of the sixth embodiment of the present invention.
Figure 8:
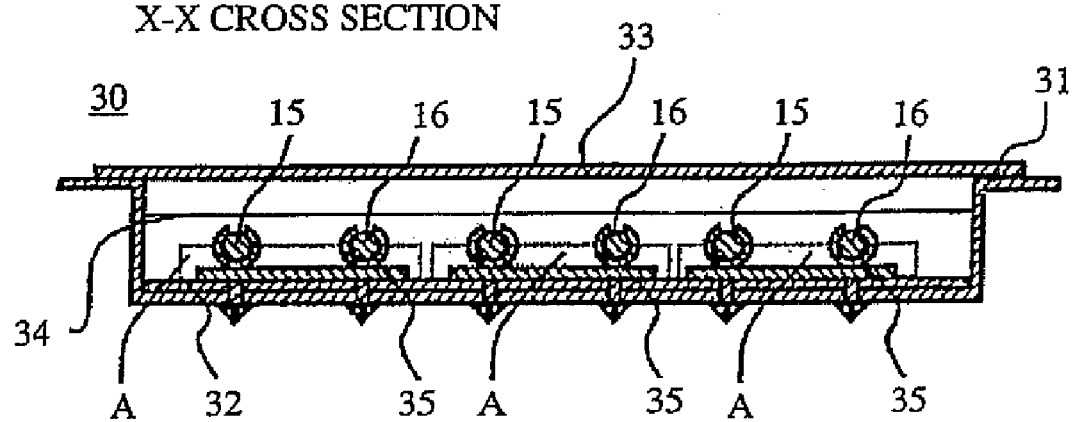
FIG. 8 is a cross section of the backlight apparatus of the sixth embodiment of the present invention.

FIG. 7 is a front elevation of the direct backlight apparatus according to the present embodiment, and FIG. 8 is a diagram illustrating the cross section indicated by arrows X-X in FIG. 7. In FIGS. 7 and 8 according to the fifth embodiment of the present invention, a case is shown where the value for n in FIG. 6 is 3 (that is, when the number of fluorescent tubes is 6), however this is merely one example and the number of fluorescent lights can be appropriately changed in accordance with a purpose of use.

As shown in FIG. 6, the fluorescent tube lighting apparatus according to the present embodiment comprises input terminals 1 and 2 and inverter circuits A1-B1, A2-B2 ... An-Bn. In the respective inverter circuits are provided the above first configuration LN1 to LNn and the above second configuration LNa and LNb as means for indirect connection, and fluorescent lights 15 and 16.

As shown in FIG. 7 and FIG. 8, a direct backlight apparatus 30 is provided with three sets of the fluorescent tube lighting apparatus described in the first embodiment which are connected in parallel to a direct-current power supply, and each set of fluorescent tubes 15 and 16 is uniformly disposed by separating them at a prescribed width. Direct backlight apparatus 30 further comprises a shield frame 31 housing the fluorescent tubes 15 and 16, a reflector plate 32 provided between shield frame 31 and fluorescent tubes 15 and 16, a light diffuser 33 disposed facing the side of fluorescent tubes 15 and 16 opposite the side on which reflector plate 32 is disposed, fixtures for both ends 34 for fixing both ends of fluorescent tubes 15 and 16, and a center fixture 35 for fixing the center of fluorescent tubes 15 and 16.

The configuration of each member will now be described excluding members that have already been described in relation to the fluorescent tube lighting apparatus. Shield frame 31 is formed by a box-shaped unit with one open side and a flange part provided in an extended condition on the circumference of the box-shaped unit in a direction opposite to the open part. Shield frame 31 can be fabricated, for example, by press working plate material comprising iron, aluminum or magnesium alloy.

Reflector plate 32 is fabricated from film comprising, for example, PET (polyethylene terephthalate) containing high reflectivity material, and of the light emitted from the fluorescent tubes, reflector plate 32 reflects most of the light emitted to the side on which reflector plate 32 is disposed to the fluorescent tubes side. A different form of reflector plate 32 that can also be used is one that comprises applying a coating of high reflectivity material to shield frame 31.

Light diffuser 33 is formed, for example, by including high diffusivity material in transparent material such as acryl or polycarbonate. Light diffuser 33 evenly diffuses light incident on the plane of incidence from fluorescent tubes 15 and 16, and emits it from a radial plane of a position facing the plane of incidence.

Fixtures for both ends 34 are support members for disposing both ends of fluorescent tubes 15 and 16 in specified positions. Inverter circuits A and B are disposed between the fixtures for both ends 34 and shield part 31, which is disposed externally to the fixtures for both ends 34. Further, center fixture 35 prevents fluorescent tubes 15 and 16, which are of extended length, from bending due to their own weight.

Operation of direct backlight apparatus 30 configured as above will now be described. When direct current is applied to inverter circuits A and B, as described in each of the above embodiments, self-excited oscillation takes place in inverter circuits A and B and at both ends of fluorescent tubes 15 and 16 sinusoidal voltages of opposite phases with respect to each other are stabilized and applied. Thus, the brightness at the two ends of fluorescent tubes 15 and 16 is equalized. Thereafter, light emitted from the fluorescent tubes is incident on the plane of incidence of light diffuser 33 and diffused, and then emitted from the radial plane. At this time, because the brightness at both ends of each fluorescent tube is equalized, light emitted from the radial plane of light diffuser 33 is emitted uniformly over the whole surface.

As described in the foregoing, according to the fluorescent tube lighting apparatus of the present embodiment it is possible to configure a direct backlight apparatus 30 that emits planar light of uniform brightness from light diffuser 33. For the present embodiment an example was described that used the fluorescent tube lighting apparatus described in the first embodiment, however, a similar effect can also be obtained using a fluorescent tube lighting apparatus described in the second to fifth embodiments.

Various modifications are also possible with respect to the positions in which to dispose inverter circuits A and B. For example, the inverter circuits may be provided on the side of shield frame 31 opposite the side on which reflector plate 32 is disposed. However, if the wires connecting fluorescent tubes 15 and 16 and the secondary windings having high voltage are long, power loss increases and the influence of uncertain elements, such as stray capacitance, is liable to occur and this can become a noise-generating factor. Therefore, it is preferable that the inverter circuits be provided in a position as close as possible to the two ends of fluorescent tubes 15 and 16.

Figure 9:
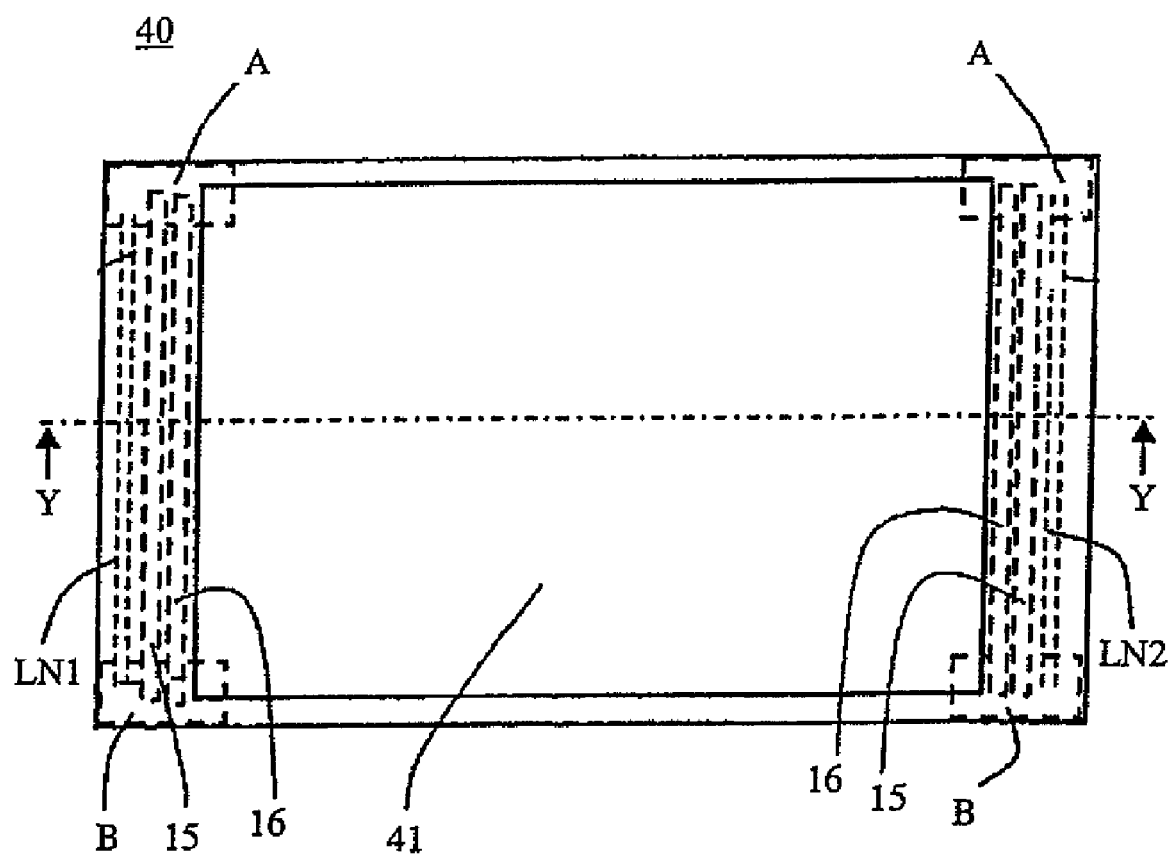
FIG. 9 is a front elevation of the backlight apparatus of the seventh embodiment of the present invention.
Figure 10:
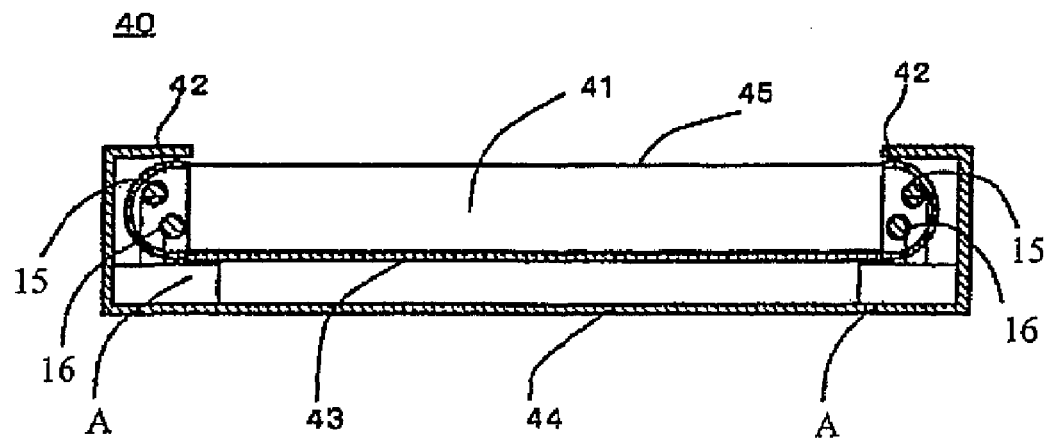
FIG. 10 is a cross section of the backlight apparatus of the seventh embodiment of the present invention.

FIG. 9 is a front elevation of a backlight apparatus using a fluorescent tube lighting apparatus according to the seventh embodiment of the present invention, and FIG. 10 is an illustration of the cross section indicated by arrows Y-Y in FIG. 9. In FIG. 9 and FIG. 10 of the seventh embodiment a case is illustrated in which the value for n in FIG. 6 is 2 (that is, when the number of fluorescent tubes is 4), however this is merely one example and the number of fluorescent tubes may be greater or less than that.

As shown in FIG. 9, in a side-edge backlight apparatus 40, fluorescent tubes 15 and 16 are disposed on the inner sides of a box-shaped housing 44 having an opening on one side, and two sets of the fluorescent tube lighting apparatus according to the first embodiment are connected in parallel to a direct-current power supply. Side-edge backlight apparatus 40 also comprises a light-guiding plate 41 disposed inside housing 44 in a condition facing fluorescent tubes 15 and 16, reflector plates 42 covering the circumference of fluorescent tubes 15 and 16 and having an opening in the direction in which light-guiding plate 41 is disposed, and a bottom reflector plate 43 provided in a condition facing the surface of the side of light-guiding plate 41 opposite the radial plane thereof.

The configuration of each member will now be described excluding the fluorescent tube lighting apparatus, which has been described already. Light-guiding plate 41 comprises highly transmissive material such as acryl or polycarbonate of a prescribed thickness, and receives from the sides the light of fluorescent tubes 15 and 16 disposed on both sides thereof and emits essentially uniform planar light from a radial plane 45.

Reflector plates 42 and bottom reflector plate 43 comprise a plate material comprising, for example, on the inner side thereof, film comprising PET (polyethylene terephthalate) containing high reflectivity material or the like, or a structure in which a high reflectivity coating is applied to a plate material, and the plates reflect light emitted from the fluorescent tubes to the side of light-guiding plate 41 without, as far as possible, any attenuation thereof.

The operation of side-edge backlight 40 formed as described above will now be described. When direct current is applied to inverter circuits A and B, as described in each of the above embodiments, inverter circuits A and B carry out self-excited oscillation, and at the two ends of fluorescent tubes 15 and 16 sinusoidal voltages of opposite phases with respect to each other are stabilized and applied. Thus, the brightness at both ends of fluorescent tubes 15 and 16 is equalized. Since all of the fluorescent tubes are synchronously, the brightness at both ends of each fluorescent tube is made uniform.

Further, light emitted from the fluorescent tubes is incident on a plane of incidence of light-guiding plate 41 to be diffused, and is then emitted from radial plane 45. At this time, because the brightness at both ends of each fluorescent tube is uniform, the brightness at both ends of the radial plane of the light-guiding plate is also uniform.

As described above, according to the present embodiment a side-edge backlight apparatus 40 can be provided that emits planar light of a uniform brightness from radial plane 45 of light-guiding plate 41. In the present embodiment an example was described that uses the fluorescent tube lighting apparatus as described in the first embodiment, however a similar effect can also be obtained using a fluorescent tube lighting apparatus as described in the second to fifth embodiments. In addition, for the seventh embodiment also, it is clear that the positions in which to dispose inverter circuits A and B are not limited to those illustrated in the figure.

Although the backlight apparatuses as described in the sixth and seventh embodiments are based on the premise that the shape of a fluorescent tube is straight, in the present invention in general the shape of a fluorescent tube is not limited thereto, and for example, an L-shape, U-shape, or C-shape tube may be used herein as appropriate. However, since a distance exists between two inverter circuits connecting to the two ends of a straight fluorescent tube because of the shape of the tube, and since that distance increases together with an increase in the length of the tube, it is clear that the indirect connections described above are effective.

Further, in this type of backlight apparatus it is better to dispose a fluorescent tube horizontally rather than vertically. This is because disposing a fluorescent tube horizontally allows the mercury distribution inside the tube to even out without any bias towards either electrode, thus extending the lifespan of the fluorescent tube. Accordingly, it is thereby possible to equalize the luminance distribution of the backlight apparatus and also to extend its lifespan as a backlight apparatus.

The foregoing describes an embodiment for a direct backlight apparatus and an embodiment for a side-edge backlight apparatus. When a liquid crystal panel is disposed facing the radial plane of these backlight apparatuses to form a liquid crystal display, because light emitted from the backlight apparatus is of high uniformity, it is possible to provide a liquid crystal display having a favorable image quality with uniform brightness over the whole display.

Next, embodiments for a liquid crystal display will be described.

As embodiments of this liquid crystal display, an example using a direct backlight apparatus will be described as the eighth embodiment and an example using a side-edge backlight apparatus will be described as the ninth embodiment.

-Direct Backlight Example-

Figure 11:
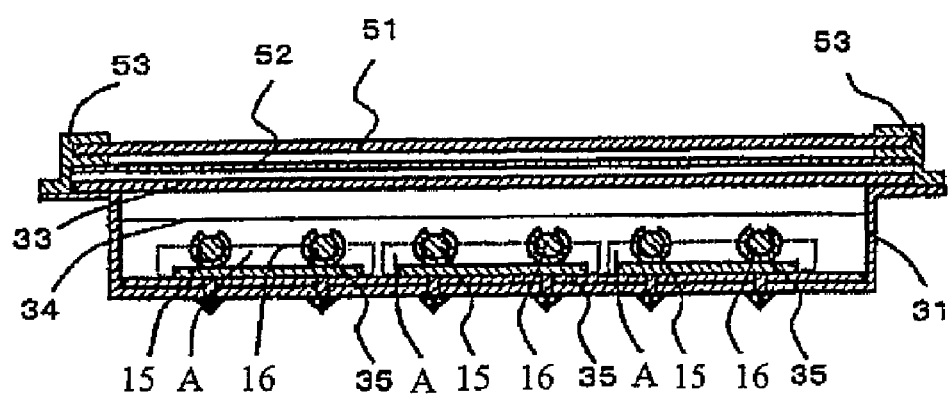
FIG. 11 is a cross section of the liquid crystal display of the eight embodiment of the present invention.

FIG. 11 is a side elevation illustrating a configuration example of a liquid crystal display according to the eighth embodiment of the present invention. Because the configuration of the direct backlight apparatus is the same as that described for the sixth embodiment, a description thereof is omitted here. As shown in FIG. 11, a liquid crystal display 50 comprises an optical sheet 52 and a liquid crystal panel 51 disposed in that order on the side of light diffuser 33 of direct backlight apparatus 30 opposite the side on which reflector plate 32 is disposed (i.e., on the radial plane side of light from light diffuser 33). Further, a driving apparatus (not shown in the figure) of the liquid crystal panel is connected to liquid crystal panel 51, and signals designating the gradation of each pixel of the liquid crystal panel are output from the driving apparatus of the liquid crystal panel to display a desired image on the display screen.

The configuration of each member will now be described. For liquid crystal panel 51, any type of translucent liquid crystal panel can be used, for example, a TFT (thin film transistor) type panel or the like may be used. For optical sheet 52, while the required functions will differ depending on the kind of device employed as liquid crystal panel 51, typically it will comprise a polarizing film or a light diffusing film or the like. However, if liquid crystal panel 51 is of a specification such that it does not require the optical sheet 52, optical sheet 52 can be omitted.

Since uniform planar light is irradiated onto liquid crystal panel 51 from direct backlight apparatus 30 comprised by liquid crystal display 50 configured as described above, it is possible to display a high quality image having a uniform level of brightness over the whole display screen.

-Side-Edge Backlight Example-

Figure 12:
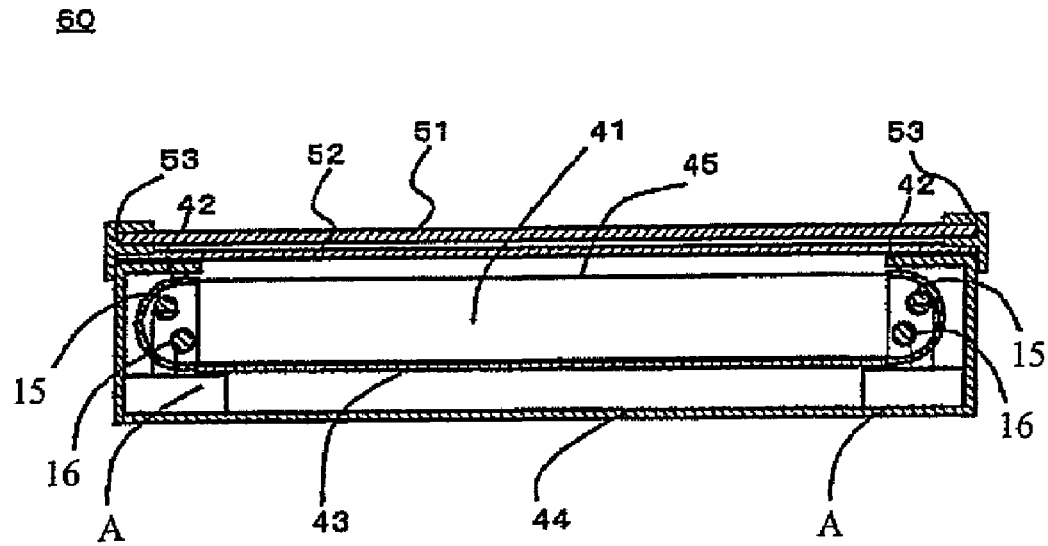
FIG. 12 is a cross section of the liquid crystal display of the ninth embodiment of the present invention.
Figure 13:
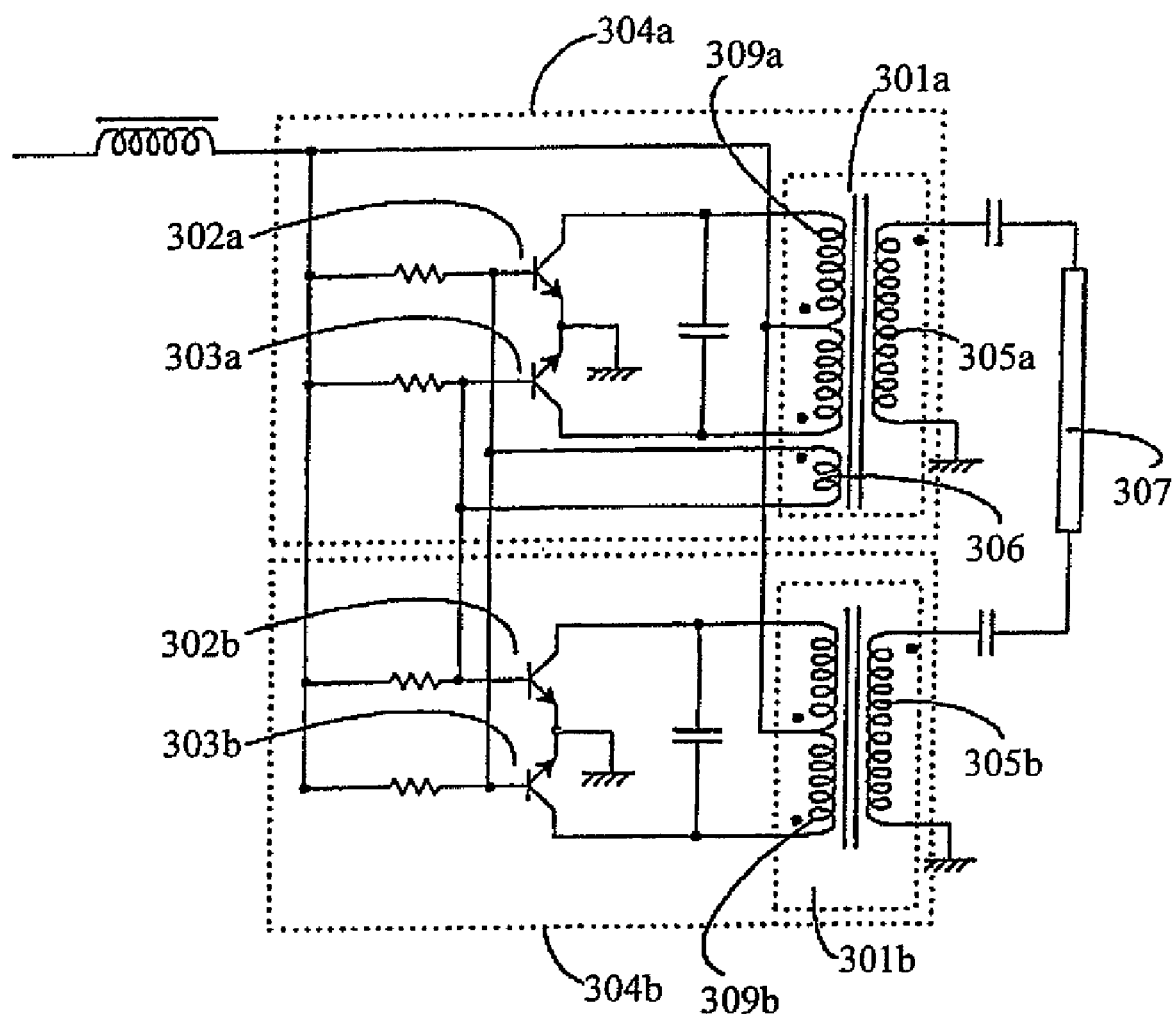
FIG. 13 is an example of a circuit diagram of a conventional fluorescent tube lighting apparatus.

FIG. 12 is a side elevation illustrating a configuration example of a liquid crystal display according to the ninth embodiment of the present invention. Because the configuration of the side-edge backlight apparatus is the same as that described for the above seventh embodiment, a description thereof is omitted here.

As shown in FIG. 12, a liquid crystal display 60 comprises an optical sheet 52 and a liquid crystal panel 51 disposed in that order facing a radial plane 45 of a side-edge backlight apparatus 40. Here, optical sheet 52 and liquid crystal panel 51 are similar to those described for the seventh embodiment, and as in that embodiment, a driving apparatus (not shown in the figure) of a liquid crystal panel is attached to liquid crystal panel 51 to control the gradation of each pixel of liquid crystal panel 51.

Since roughly uniform planar light is irradiated onto liquid crystal panel 51 from side-edge backlight apparatus 40 comprised by liquid crystal display 60 having the above configuration, it is possible to display a high quality image having a uniform brightness over the whole display.

Further, although the liquid crystal displays as described in the eighth and ninth embodiments are based on the premise that the shape of a fluorescent tube is straight, in general in the present invention the shape of a fluorescent tube is not limited thereto, and, for example, an L-shape, U-shape, or C-shape tube may be used herein as appropriate. Also, since a distance exists between two inverter circuits connecting to the two ends of a straight fluorescent tube because of the shape of the tube, and since that distance increases together with an increase in the length of the tube, it is obvious that the indirect connections described above are effective.

In this type of liquid crystal display it is better to dispose a fluorescent tube horizontally with respect to the ground rather than in a vertical direction. This is because disposing the fluorescent tube horizontally allows the mercury distribution inside the tube to even out without any bias towards either electrode, thus extending the lifespan of the fluorescent tube. Accordingly, it is thereby possible to equalize the luminance distribution of the liquid crystal display, and also to extend its lifespan as a liquid crystal display.

INDUSTRIAL APPLICABILITY

As described in the foregoing, using the inverter circuits according to the present invention it is possible to stabilize voltages applied at both ends of a driven unit to reverse the phases of the voltages with respect to each other. Thus it is possible to equalize the output at both ends of a driven unit.

In addition, the fluorescent tube driving apparatus of the present invention can stabilize voltages applied at both ends of a fluorescent tube to reverse the phases of the voltages with respect to each other. Therefore, it is possible to provide a fluorescent tube driving apparatus capable of uniformly driving the brightness at both ends of a fluorescent tube.

Further, according to the fluorescent tube driving apparatus of the present invention, by connecting the inverter circuits in opposite phase, a fluorescent tube driving apparatus can be provided that is capable of uniformly driving the brightness at both ends of a fluorescent tube even when using inverter circuits having common specifications.

In addition, according to the fluorescent tube driving apparatus of the present invention, a fluorescent tube driving apparatus can be provided wherein the brightness of two or more fluorescent tubes is equal.

Also, because the fluorescent tube driving apparatus of the present invention enables the reduction of noise within each inverter circuit, a fluorescent tube driving apparatus having low noise can be provided.

Further, because the fluorescent tube driving apparatus of the present invention can reduce noise propagated between inverter circuits, a fluorescent tube driving apparatus having low noise can be provided.

Furthermore, according to the backlight apparatus of the present invention the two ends of a fluorescent tube used in the backlight apparatus emit light of a uniform brightness. Thus, a backlight apparatus can be provided that can supply uniform planar luminescence.

Still further, according to the liquid crystal display of the present invention uniform planar luminescence is supplied from a backlight apparatus. Therefore, it is possible to provide a liquid crystal display that can equalize the brightness of the entire display screen to provide high image quality.

The invention claimed is:

1. A backlight apparatus comprising:
   a plurality of long-tubular-type fluorescent tubes disposed so that the longitudinal directions thereof are parallel to one another; and
   first and second inverter transformers,
   wherein the inverter transformers apply voltages having opposite phases to respective ends of each fluorescent tube for driving the plurality of fluorescent tubes simultaneously, and apply voltages having opposite phases to the respective adjacent ends of the plurality of fluorescent tubes, and
   wherein a transformer having a single primary winding and a plurality of secondary windings that convert a voltage inputted to the primary winding into a high voltage and output the high voltage is used for each inverter transformer.

2. The backlight apparatus according to claim 1, wherein at least two of the plurality of secondary windings are wound reversely with each other.

3. A backlight apparatus comprising:
   a plurality of long-tubular-type fluorescent tubes disposed so that the longitudinal directions thereof are parallel to one another; and
   first and second inverter transformers, each having a plurality of secondary windings each for increasing a voltage inputted to a primary winding and outputting the increased voltage,
   wherein the voltage increased by one of the secondary windings of the first inverter transformer is applied to one-end side of the fluorescent tubes, and the voltage increased by one of the secondary windings of the other inverter transformer is applied to the other-end side of the fluorescent tubes, so as to drive the plurality of fluorescent tubes, and
   wherein the number of windings of the first inverter transformer is the same as the number of windings of the second inverter transformer.

4. The backlight apparatus according to claim 3, wherein the magnitudes of the voltages applied to the ends of the fluorescent tubes are essentially same.

5. The backlight apparatus according to claim 1 or 3, further comprising:
   a pair of both-end fixtures for disposing the ends of each of the fluorescent tubes in predetermined positions; and
   a fixture for fixing each of the fluorescent tubes between the both-end fixtures.

6. The backlight apparatus according to claim 5, wherein a plurality of the fixtures are provided between the both-end fixtures for at least one of the plurality of fluorescent tubes.

7. A liquid crystal display device comprising:
   the backlight apparatus according to claim 1 or 3; and
   a liquid crystal panel illuminated by the backlight apparatus for displaying video.

8. A backlight apparatus comprising,
   a plurality of fluorescent tubes disposed so that the longitudinal directions thereof are substantially parallel to one another; and
   an inverter circuit having first and second inverter transformers,
   wherein the inverter transformers apply voltages having opposite phases to respective ends of each fluorescent tube for driving the plurality of fluorescent tubes simultaneously, and apply voltages having opposite phases to the respective adjacent ends of the plurality of fluorescent tubes, and
   wherein the inverter transformers each have a single primary winding and a plurality of secondary windings that convert a voltage inputted to the primary winding into a high voltage and output the high voltage.

9. A drive apparatus comprising:
   first and second inverter transformers each having a primary winding and a plurality of secondary windings for increasing a voltage inputted to the primary winding, the apparatus driving a plurality of fluorescent tubes disposed so that the longitudinal directions thereof are substantially parallel to one another, wherein, when the plurality of fluorescent tubes are driven, the voltage increased by one of the secondary windings of the first inverter transformer is applied to one-end of the fluorescent tubes, and the voltage increased by one of the secondary windings of the other inverter transformer is applied to the other-end of the fluorescent tubes, and wherein the number of windings of the first inverter transformer, is the same as the number of windings of the second inverter transformer.

10. The drive apparatus according to claim 9, wherein the magnitudes of voltages applied to the ends of the fluorescent tubes are essentially same.

11. An inverter circuit comprising:

first and second inverter transformers each having a primary winding and a plurality of secondary windings for increasing a voltage inputted to the primary winding, the apparatus driving a plurality of fluorescent tubes disposed so that the longitudinal directions thereof are substantially parallel to one another, wherein, when the inverter circuit is used for driving the plurality of fluorescent tubes, the voltage increased by one of the secondary windings of the first inverter transformer is applied to one-end of the fluorescent tubes, and the voltage increased by one of the secondary windings of the second inverter transformer is applied to the other-end of the fluorescent tubes, and wherein the number of windings of the first inverter transformer, is the same as the number of windings of the second inverter transformer.

12. A backlight apparatus comprising:

a plurality of long-tubular-type fluorescent tubes disposed so that the longitudinal directions thereof are parallel to one another; and an inverter transformer, wherein the inverter transformer applies voltages having opposite phases to adjacent ends of each of the fluorescent tubes for driving the plurality of fluorescent tubes simultaneously, and wherein a transformer having a single primary winding and a plurality of secondary windings that convert a voltage inputted to the primary winding into a high voltage and output the high voltage is used as the inverter transformer.

13. The backlight apparatus according to claim 12, wherein at least two of the plurality of secondary windings are wound reversely with each other.

14. A backlight apparatus comprising:

a plurality of long-tubular-type fluorescent tubes disposed so that the longitudinal directions thereof are parallel to one another; and a plurality of secondary windings each for increasing a voltage inputted to a primary winding and outputting the increased voltage, wherein the voltage increased by one of the secondary windings is applied to one-end side of one of the fluorescent tubes, and the voltage increased by the other secondary winding is applied to a one-end side of a fluorescent tube adjacent to the on fluorescent tube, so as to drive the plurality of fluorescent tubes, and wherein the number of windings of an inverter transformer which supplies the voltage to one-end side of the plurality of fluorescent tubes, is the same as the number of windings of an inverter transformer which supplies the voltage to the other-end side of the plurality of fluorescent tubes.

15. The backlight apparatus according to claim 14, wherein the magnitudes of the voltages applied to the ends of the fluorescent tubes are essentially same.

16. The backlight apparatus according to claim 12 or 14, further comprising:

a pair of both-end fixtures for disposing the ends of each of the fluorescent tubes in predetermined positions; and a fixture for fixing each of the fluorescent tubes between the both-end fixtures.

17. The backlight apparatus according to claim 16, wherein a plurality of the fixtures are provided between the both-end fixtures for at least one of the plurality of fluorescent tubes.

18. A liquid crystal display device comprising:

the backlight apparatus according to claim 12 or 14; and a liquid crystal panel illuminated by the backlight apparatus for displaying video.

19. A backlight apparatus comprising:

a plurality of fluorescent tubes disposed so that the longitudinal directions thereof are substantially parallel to one another; and an inverter circuit, wherein the inverter circuit applies voltages having opposite phases to the adjacent ends of each of the fluorescent tubes for driving the plurality of fluorescent tubes simultaneously, and wherein the inverter circuit is provided with a transformer having a single primary winding and a plurality of secondary windings that convert a voltage inputted to the primary winding into a high voltage and output the high voltage.

20. A drive apparatus comprising:

an inverter transformer having a primary winding and a plurality of secondary windings for increasing a voltage inputted to the primary winding, the apparatus driving a plurality of fluorescent tubes disposed so that the longitudinal directions thereof are substantially parallel to one another, wherein, when the plurality of fluorescent tubes are driven, the voltage increased by one of the secondary windings is applied to one-end of one fluorescent tube of the plurality of fluorescent tubes, and the voltage increased by the other secondary winding is applied to an end of another fluorescent tube of the plurality of fluorescent tubes that is adjacent to the one-end of the one fluorescent tube, and wherein the number of windings of an inverter transformer which supplies the voltage to one-end side of the plurality of fluorescent tubes, is the same as the number of windings of an inverter transformer which supplies the voltage to the other-end side of the plurality of fluorescent tubes.

21. The drive apparatus according to claim 20, wherein the magnitudes of voltages applied to the ends of the fluorescent tubes are essentially the same.

22. An inverter circuit comprising:

an inverter transformer having a primary winding and a plurality of secondary windings for increasing a voltage inputted to the primary winding, the apparatus driving a plurality of fluorescent tubes disposed so that the longitudinal directions thereof are substantially parallel to one another, wherein, when the inverter circuit is used for driving the plurality of fluorescent tubes, the voltage increased by one of the secondary windings is applied to one-end of one fluorescent tube of the plurality of fluorescent tubes, and the voltage increased by the other secondary winding is applied to an end of another fluorescent tube of the plurality of fluorescent tubes that is adjacent to the one-end of the one fluorescent tube, and wherein the number of windings of an inverter transformer which supplies the voltage to one-end side of the plurality of fluorescent tubes, is the same as the number of windings of an inverter transformer which supplies the voltage to the other-end side of the plurality of fluorescent tubes.

\* \* \* \* \*